United States Patent
Rostamzadeh et al.

(10) Patent No.: US 11,900,818 B2
(45) Date of Patent: Feb. 13, 2024

(54) TIME VARYING LOUDNESS PREDICTION SYSTEM

(71) Applicant: Joby Aero, Inc., Santa Cruz, CA (US)

(72) Inventors: Alireza Rostamzadeh, Foster City, CA (US); Rohit Goyal, San Francisco, CA (US); Ryan Cunningham, San Francisco, CA (US); Jane Yen Hung, San Francisco, CA (US); Stanley Swaintek, Mill Valley, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 400 days.

(21) Appl. No.: 16/897,699

(22) Filed: Jun. 10, 2020

(65) Prior Publication Data

US 2020/0388166 A1    Dec. 10, 2020

Related U.S. Application Data

(60) Provisional application No. 62/859,685, filed on Jun. 10, 2019.

(51) Int. Cl.
*G08G 5/00*   (2006.01)
*G06N 20/00*   (2019.01)
(Continued)

(52) U.S. Cl.
CPC .......... *G08G 5/0034* (2013.01); *G01C 21/20* (2013.01); *G06N 5/04* (2013.01); *G06N 20/00* (2019.01); *G08G 5/0047* (2013.01); *G01W 1/10* (2013.01)

(58) Field of Classification Search
CPC .... G08G 5/0034; G08G 5/0047; G06N 20/00; G06N 5/04; G01C 21/20; G01W 1/10
See application file for complete search history.

(56) References Cited

U.S. PATENT DOCUMENTS 6,974,105 B2   12/2005   Pham
7,648,338 B1   1/2010   Welsh
(Continued)

FOREIGN PATENT DOCUMENTS

WO   2019217427   11/2019
WO   2020251988   12/2020

OTHER PUBLICATIONS

English Translation of WO 2017088154 A1 Author: Ma et al. Title: Profile Mode Switching Method Date: Jun. 1, 2017 (Year: 2017).*
(Continued)

*Primary Examiner* — James J Lee
*Assistant Examiner* — Steven Vu Nguyen
(74) *Attorney, Agent, or Firm* — Dority & Manning, P.A.

(57) ABSTRACT

Disclosed are methods and systems for predicting time varying loudness in a geographic region. Training data, including noise information, weather information, and traffic information is collected from a plurality of sensors located in a plurality of geographic regions. The information is collected during multiple time periods. The noise information includes time varying loudness. Static features of the geographic regions are also defined and included in the training data. The static and time varying dynamic features train a model. The model is used predict time varying loudness within a different region and at a time later than times the training data is collected. The predicted loudness levels are utilized, in some aspects, to determine a route for an aircraft.

20 Claims, 18 Drawing Sheets

(51) Int. Cl.
*G01C 21/20* (2006.01)
*G06N 5/04* (2023.01)
*G01W 1/10* (2006.01)

(56) References Cited

U.S. PATENT DOCUMENTS

| | | |
|---|---|---|
| 7,665,688 B2 | 2/2010 | Cylinder et al. |
| 8,931,732 B2 | 1/2015 | Sirohi et al. |
| 9,776,715 B2 | 10/2017 | Zhou et al. |
| 9,828,107 B1 | 11/2017 | Ruymgaart et al. |
| 10,011,346 B2 | 7/2018 | Beckman et al. |
| 10,370,098 B1 | 8/2019 | Beckman et al. |
| 10,518,595 B2 | 12/2019 | Dietrich |
| 10,960,975 B1 | 3/2021 | Villa |
| 2009/0164260 A1 | 6/2009 | Kane |
| 2010/0172510 A1 | 7/2010 | Juvonen |
| 2011/0056183 A1 | 3/2011 | Sankrithi et al. |
| 2011/0087428 A1 | 4/2011 | Barnetche et al. |
| 2012/0237049 A1 | 9/2012 | Brown et al. |
| 2015/0379874 A1 | 12/2015 | Ubhi et al. |
| 2016/0368600 A1 | 12/2016 | Frolov et al. |
| 2017/0154618 A1* | 6/2017 | Beckman ......... G10K 11/17857 |
| 2017/0197710 A1* | 7/2017 | Ma ..................... G08G 5/0013 |
| 2017/0274983 A1 | 9/2017 | Beckman et al. |
| 2017/0355459 A1* | 12/2017 | Erickson ................. B64D 3/00 |
| 2018/0018887 A1 | 1/2018 | Sharma et al. |
| 2018/0029431 A1 | 2/2018 | Tang et al. |
| 2018/0061245 A1 | 3/2018 | Adler et al. |
| 2018/0082597 A1 | 3/2018 | Nicol et al. |
| 2018/0286254 A1 | 10/2018 | Westervelt et al. |
| 2018/0286372 A1 | 10/2018 | Beckman et al. |
| 2018/0308366 A1 | 10/2018 | Goel et al. |
| 2018/0331940 A1 | 11/2018 | Jadhav et al. |
| 2019/0023385 A1 | 1/2019 | Nguyen |
| 2019/0033084 A1 | 1/2019 | Chen et al. |
| 2019/0047342 A1 | 2/2019 | Dietrich |
| 2019/0135426 A1 | 5/2019 | Bailie |
| 2019/0189016 A1* | 6/2019 | Kubie .................. G05D 1/0005 |
| 2019/0340933 A1 | 11/2019 | Villa |
| 2019/0340934 A1 | 11/2019 | Villa et al. |
| 2019/0340937 A1 | 11/2019 | Villa |
| 2020/0103922 A1 | 4/2020 | Nonami et al. |
| 2021/0061459 A1 | 3/2021 | Erengil et al. |

OTHER PUBLICATIONS

"U.S. Appl. No. 16/169,726, Non Final Office Action—Prioritized Exam dated Mar. 25, 2019".
"U.S. Appl. No. 16/169,726, Response filed Jun. 24, 2019 to Non-Final Office Action—Prioritized Exam dated Mar. 25, 2019", 18 pgs.
"International Application Serial No. PCT US2019 031124, International Search Report dated Jul. 19, 2019", 5 pgs.
"International Application Serial No. PCT US2019 031124, Written Opinion dated Jul. 19, 2019", 7 pgs.
"U.S. Appl. No. 16/169,726, Final Office Action dated Aug. 14, 2019", 9 pgs.
"U.S. Appl. No. 16/169,726, Response filed Oct. 23, 2019 to Final Office Action dated Aug. 14, 2019", 10 pgs.
"U.S. Appl. No. 16/169,726, Notice of Allowance dated Nov. 6, 2019", 5 pgs.
"U.S. Appl. No. 16/405,493, Preliminary Amendment filed Apr. 23, 2020", 7 pgs.
Bart, De Jong, "Optimizing cost effectiveness and flexibility of air taxis", Haarlem, (Sep. 30, 2007), 62 pgs.
F M Van, Der Zwan, "Development of an Aircraft Routing System for an Air Taxi Operator", (Sep. 12, 2016), 24 pgs.
Peterson, Jon, "Fast Forwarding to a World of On-Demand Air Transportation Part 1 of 2", Smart Urban Transportation Forum, (May 15, 2017), 21 pgs.
Peterson, Jon, "Fast Forwarding to a World of On-Demand Air Transportation Part 2 of 2", Smart Urban Transportation Forum, (May 15, 2017), 23 pgs.
Uber, "Fast-Forwarding to a Future of On-Demand Urban Air Transportation Introduction", Uber Elevate, (Oct. 27, 2016), 98 pgs.
"International Application Serial No. PCT US2020 036953, International Search Report dated Sep. 10, 2020", 5 pgs.
"International Application Serial No. PCT US2020 036953, Written Opinion dated Sep. 10, 2020", 6 pgs.
"International Application Serial No. PCT US2019 031124, International Preliminary Report on Patentability dated Nov. 19, 2020", 9 pgs.
Downing, Micah J, "Noise Simulation Modeling for Airport Noise Analysis Noise Simulation Modeling for Airport Noise Analysis", The 33rd International Congress and Exposition on Noise Control Engineering, (Aug. 22, 2004).
Givargis, SH, "A basic neural traffic noise prediction model for Tehran's roads", Journal of Environmental Management, Elsevier, Amsterdam, NL, vol. 91, No. 12, (Dec. 1, 2010), 2529-2534.
Yingjie, Yang, "Airport noise simulation using neural networks", Neural Networks, 2008. IJCNN 2008. (IEEE World Congress on Computational Intelligence). IEEE International Joint Conference on, IEEE, (Jun. 1, 2008), 1917-1923.
"U.S. Appl. No. 16/405,493, Response filed Sep. 14, 2021 to Non Final Office Action dated Jun. 14, 2021", 9 pgs.
"International Application Serial No. PCT US2020 036953, International Preliminary Report on Patentability dated Sep. 10, 2021", 8 pages.
"U.S. Appl. No. 16/405,493, Notice of Allowance dated Sep. 30, 2021", 5 pgs.
"U.S. Appl. No. 16/405,493, Corrected Notice of Allowability dated Oct. 15, 2021", 2 pgs.
"Application Serial No. PCT US2020 036953, Written Opinion of the International Preliminary Examining Authority dated May 4, 2021", 4 pgs.
"U.S. Appl. No. 16/405,493, Non Final Office Action dated Jun. 14, 2021", 8 pgs.
"European Application Serial No. 19726243.9, Response to Communication Pursuant to Rules 161 and 162 filed Jun. 25, 2021", 13 pgs.

\* cited by examiner

TIME VARYING LOUDNESS PREDICTION SYSTEM

CROSS REFERENCE TO RELATED APPLICATIONS

This application claims priority to U.S. Provisional Application No. 62/859,685, filed Jun. 10, 2019 and entitled "Time Varying Loudness Prediction via a Trained Model." The contents of this prior application is considered part of this application, and is hereby incorporated by reference in its entirety.

FIELD

This document pertains generally, but not by way of limitation, to methods and systems for predicting noise and generating noise map data for a particular environment.

BACKGROUND

Every day, millions of hours are wasted on the road worldwide. The average San Francisco resident spends 230 hours per year commuting between work and home, which equates to more half a million hours of productivity lost every single day in this city alone. In Los Angeles and Sydney, residents spend seven whole working weeks each year commuting, two of which are wasted unproductively stuck in gridlock. In many global megacities, the problem is more severe: the average commute in Mumbai exceeds a staggering 90 minutes. For workers, this amounts to less time with family, less time at work growing our economies, more money spent on fuel—and a marked increase in worker stress levels. A study in the American Journal of Preventative Medicine, for example, found that those who commute more than 10 miles were at increased odds of elevated blood pressure.

One proposed solution to the above transportation and mobility problems may lie with on-demand aviation. On-demand aviation has the potential to radically improve urban mobility, giving people back time lost in their daily commutes. Urban air transportation provides the possibility to use three-dimensional airspace to alleviate transportation congestion on the ground. A network of small, electric aircraft that take off and land vertically (called VTOL aircraft for Vertical Take-off and Landing, and pronounced vee-tol), would enable rapid, reliable transportation between suburbs and cities and, ultimately, within cities.

While on-demand aviation provides solutions to the above problems, one factor inhibiting adoption is a concern for noise generated by these operations. Exposure to noise has both psychological and physiological impacts on those within range of that noise. For example, one reason heliports are not currently located in or near large demand centers is that the noise from these rotorcraft would be too disruptive and unacceptable to the community.

Thus, improved methods of operating on-demand aircraft in a manner that minimizing noise impact to a surrounding community are needed.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

Figure 6A:
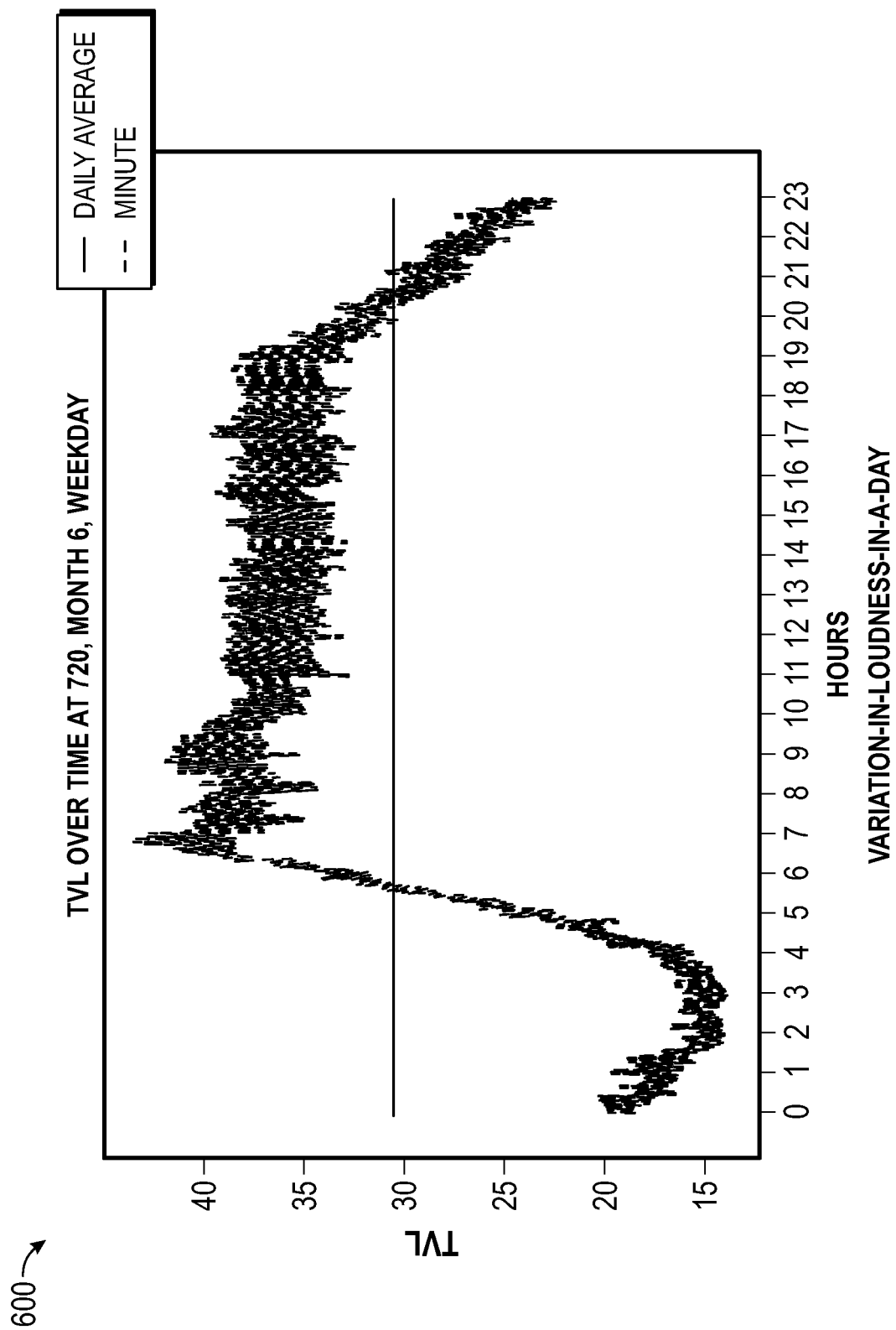

FIG. 6A. shows observations collected via the measurement devices described above.

Figure 6B:
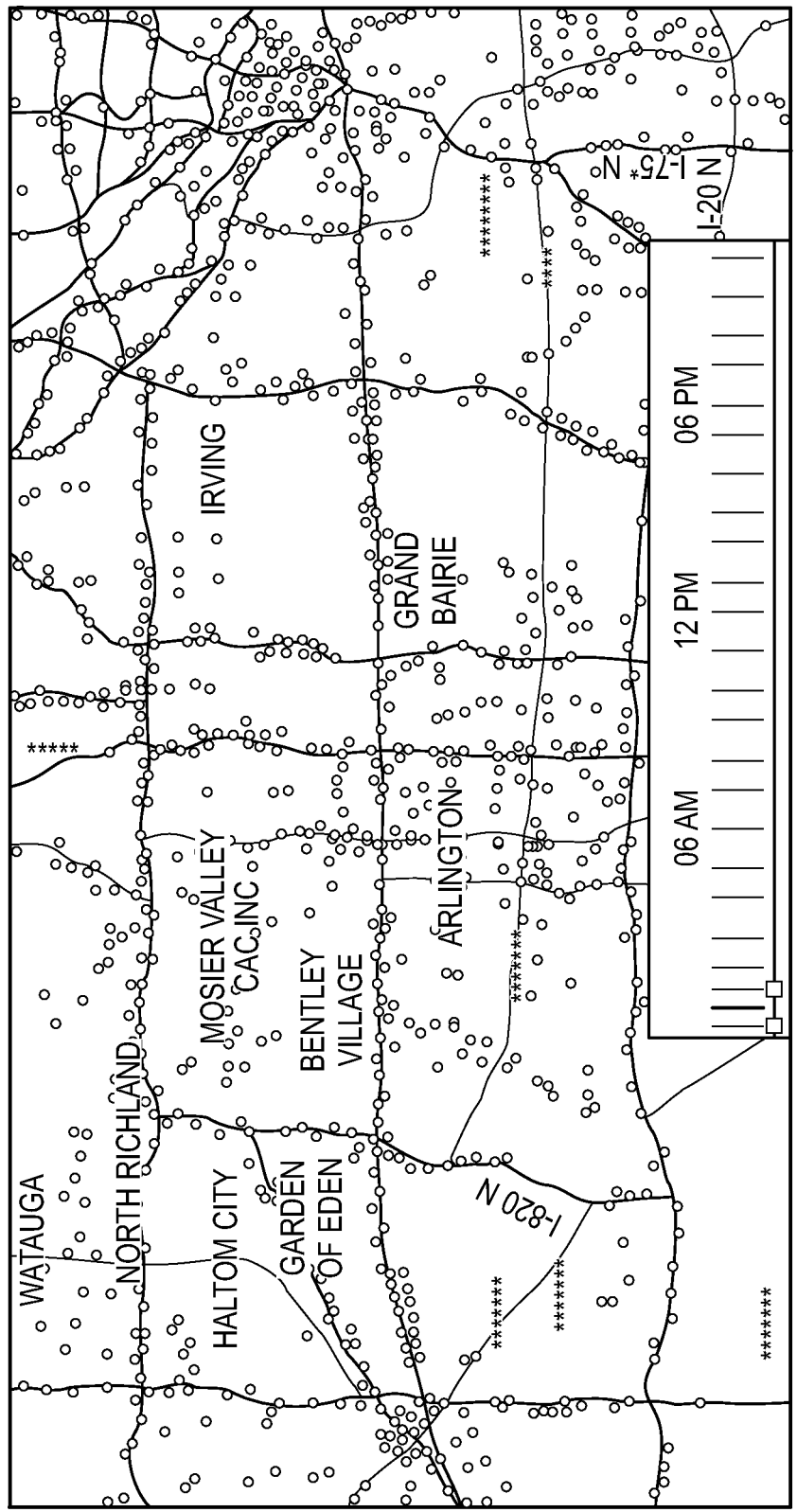

FIG. 6B shows noise levels in a geographic region at a particular time of day.

Figure 7A:
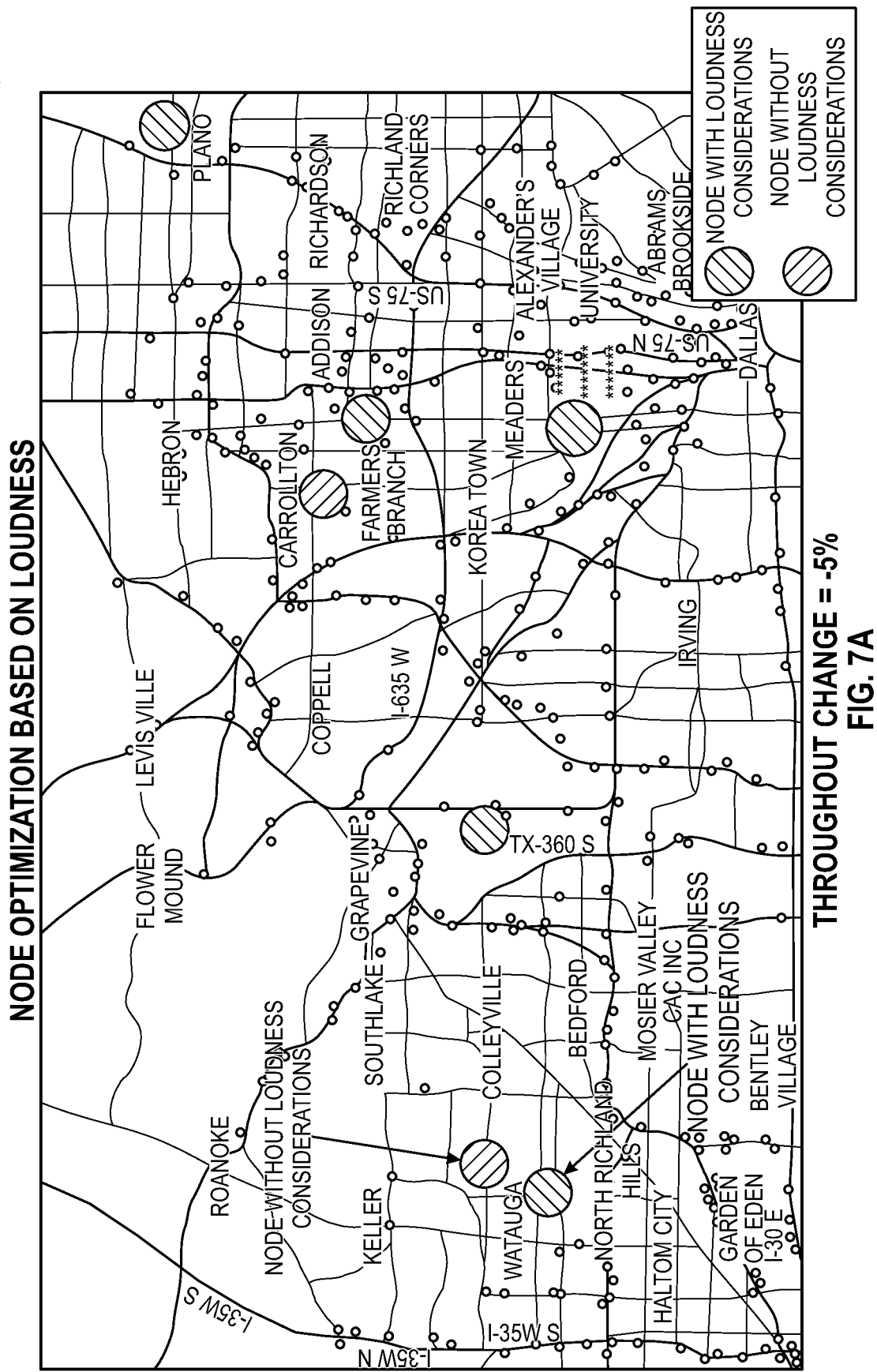

FIG. 7A shows node optimization based on loudness, according to at least some of the disclosed embodiments.

Figure 7B:
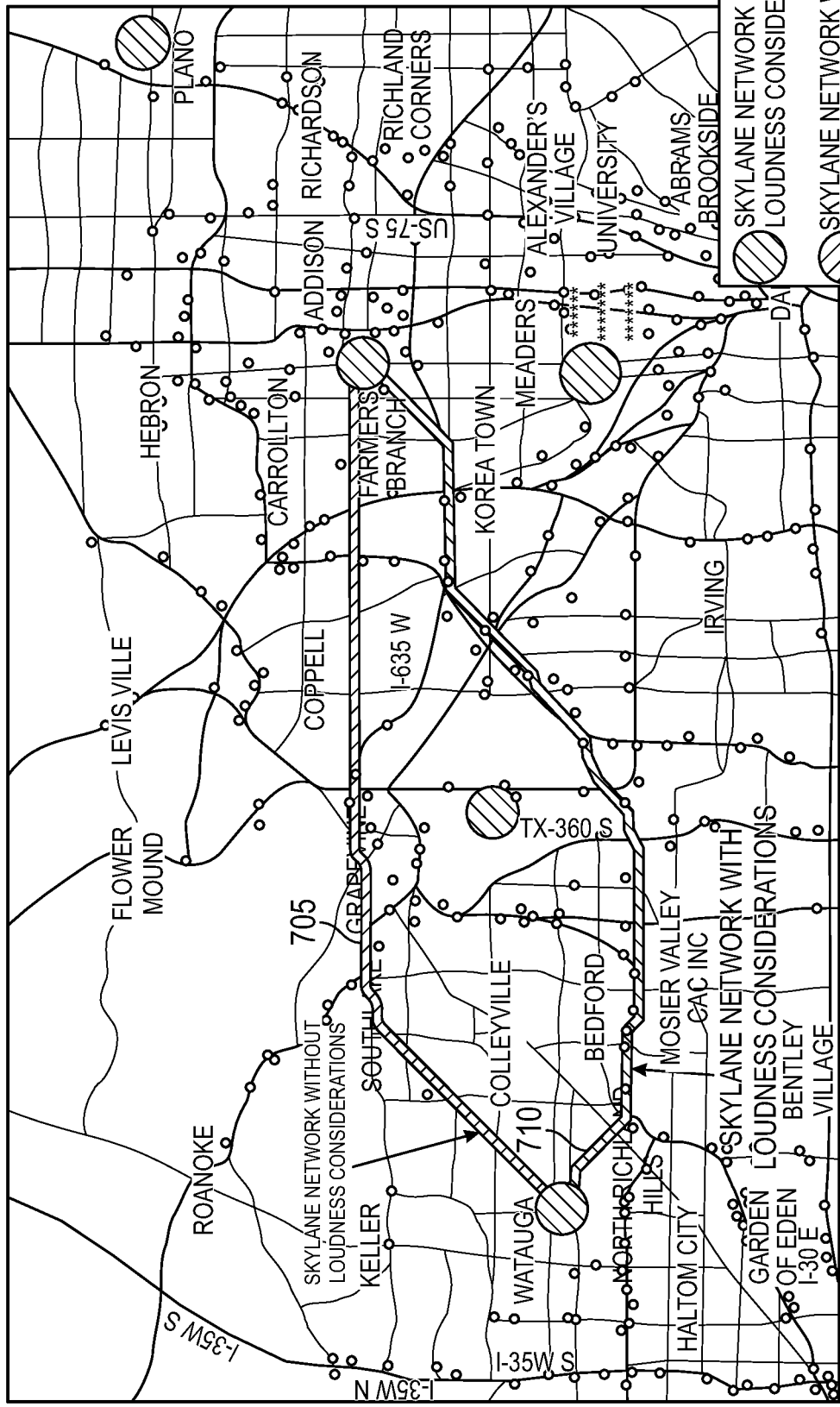

FIG. 7B shows selection of a sky lane based on loudness data, according to at least some of the disclosed embodiments.

Figure 8:
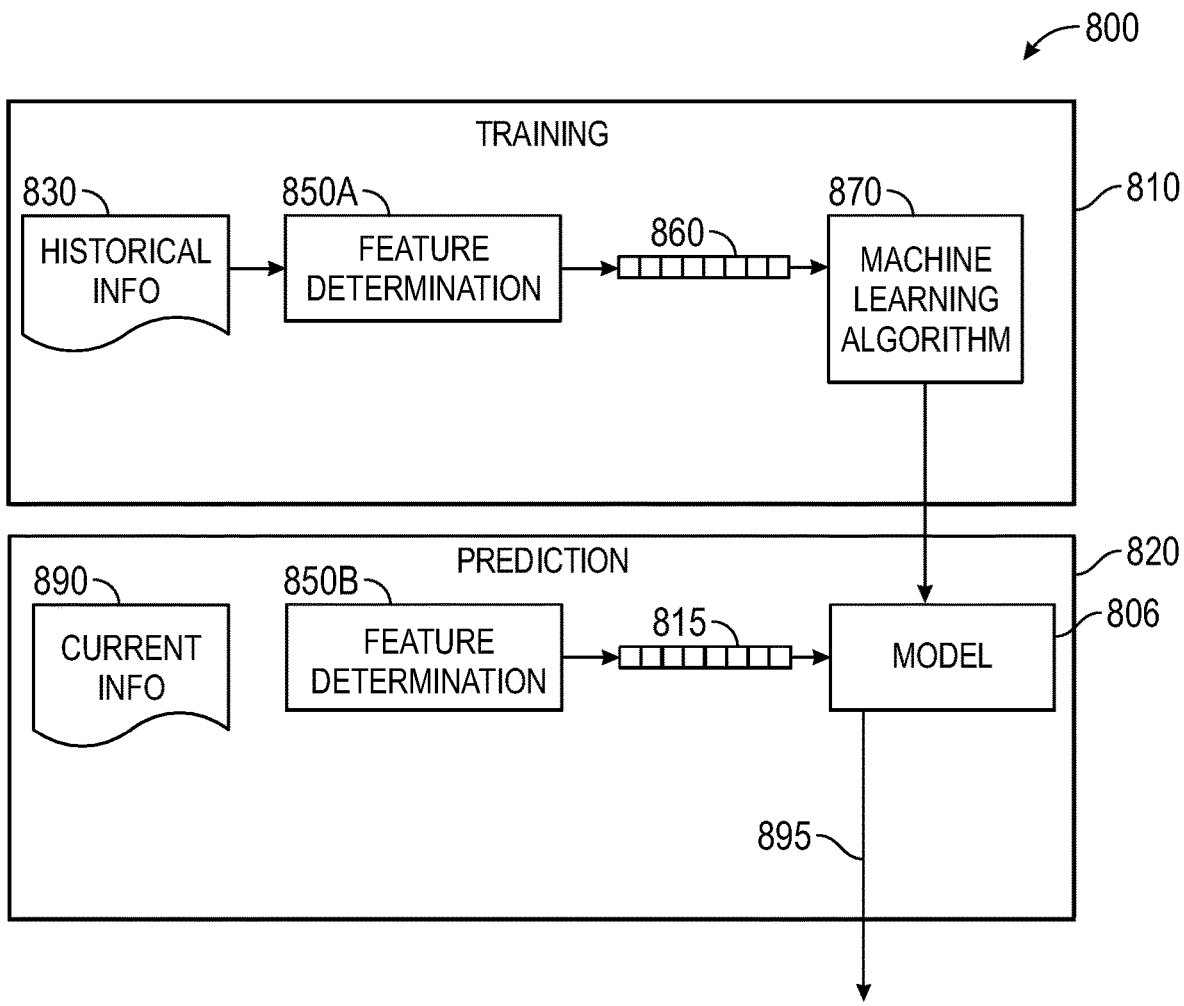
Figure 9:
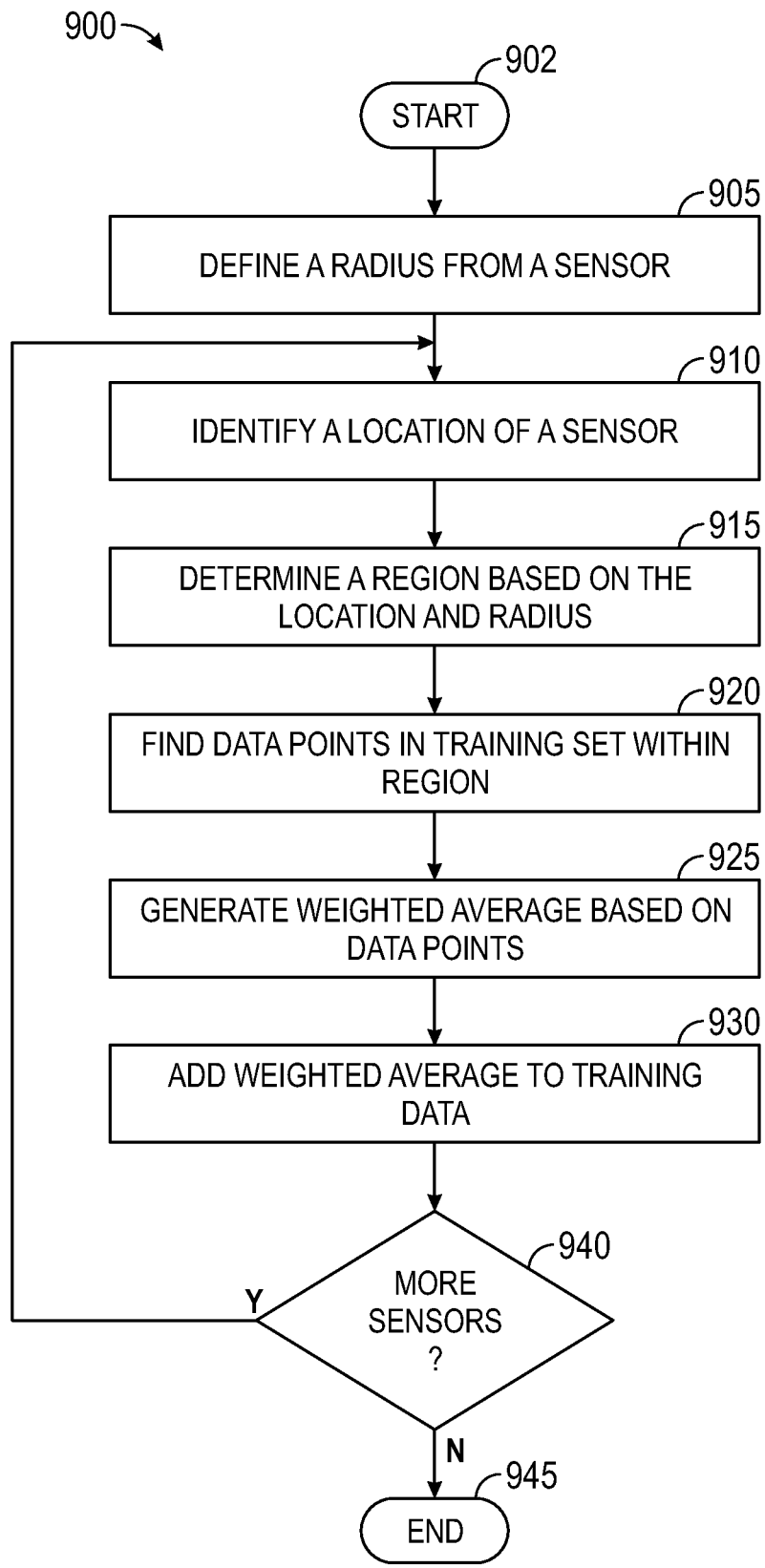

FIG. 8 shows an example machine learning module 800 according to some examples of the present disclosure FIG. 9 is a flowchart of a process for normalizing training data according to at least some of the disclosed embodiments.

Figure 10:
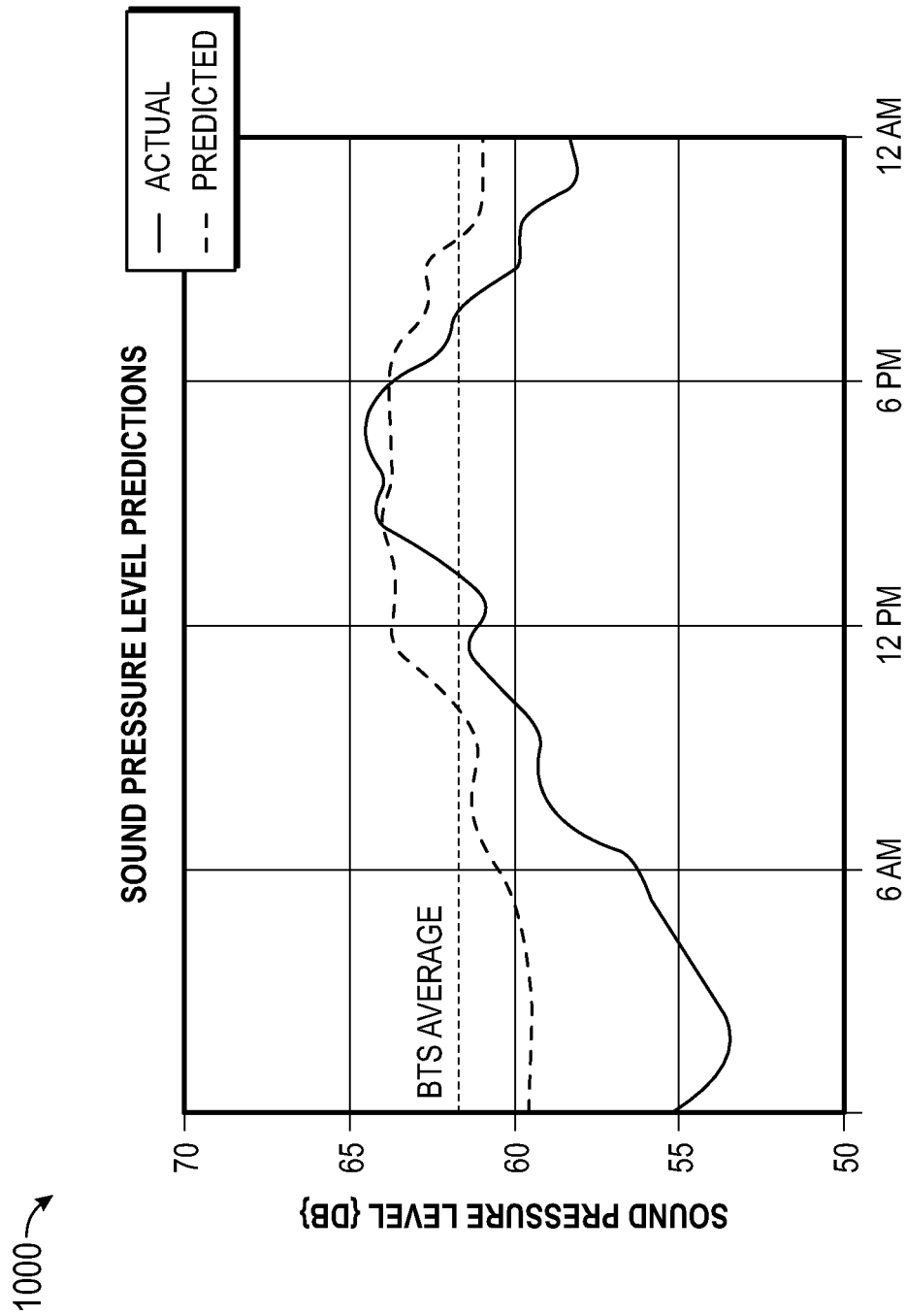

FIG. 10 shows one observation of analysis of the training set described above.

Figure 11:
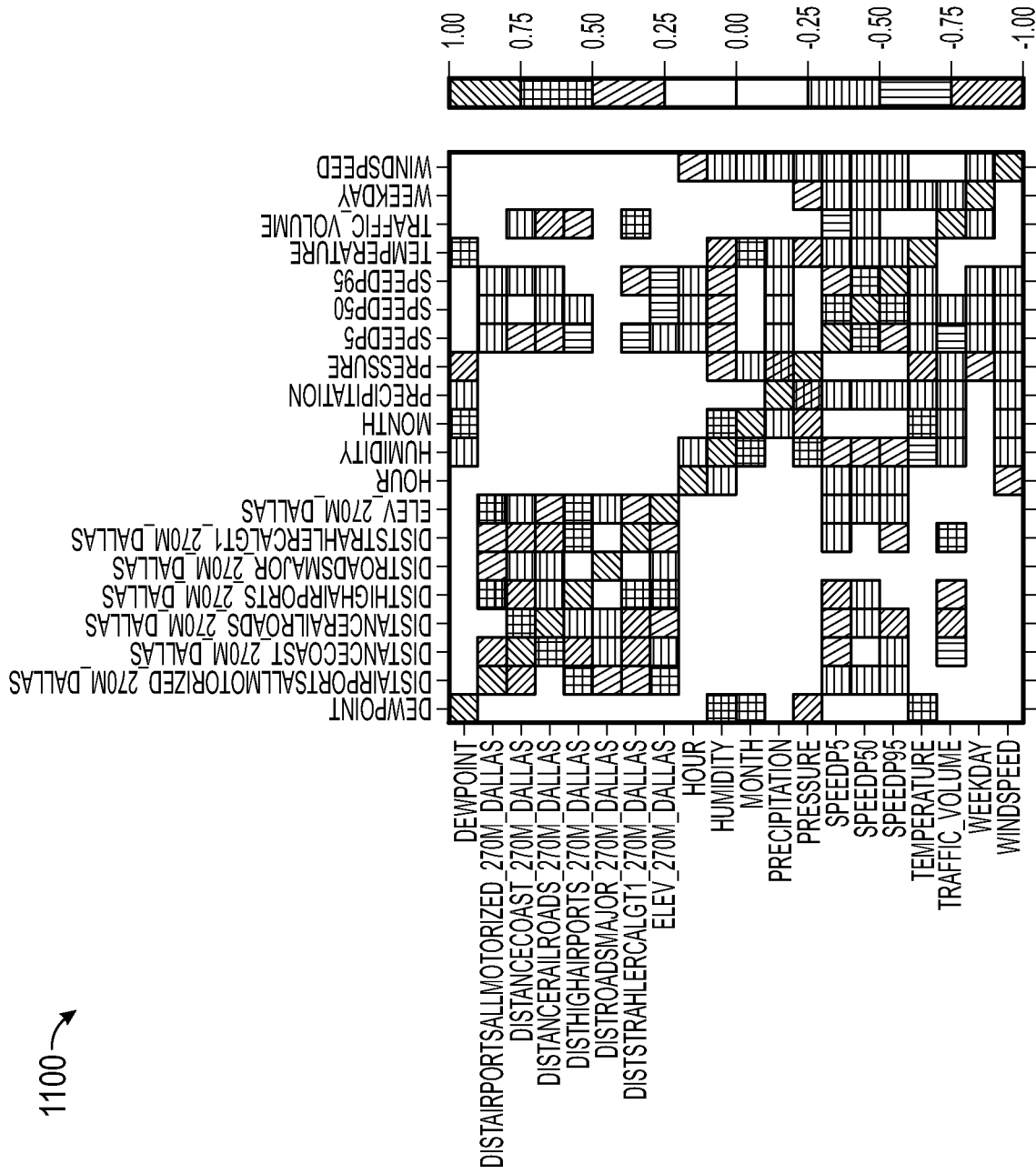

FIG. 11 shows a correlation matrix of one embodiment's model features.

Figure 12A:
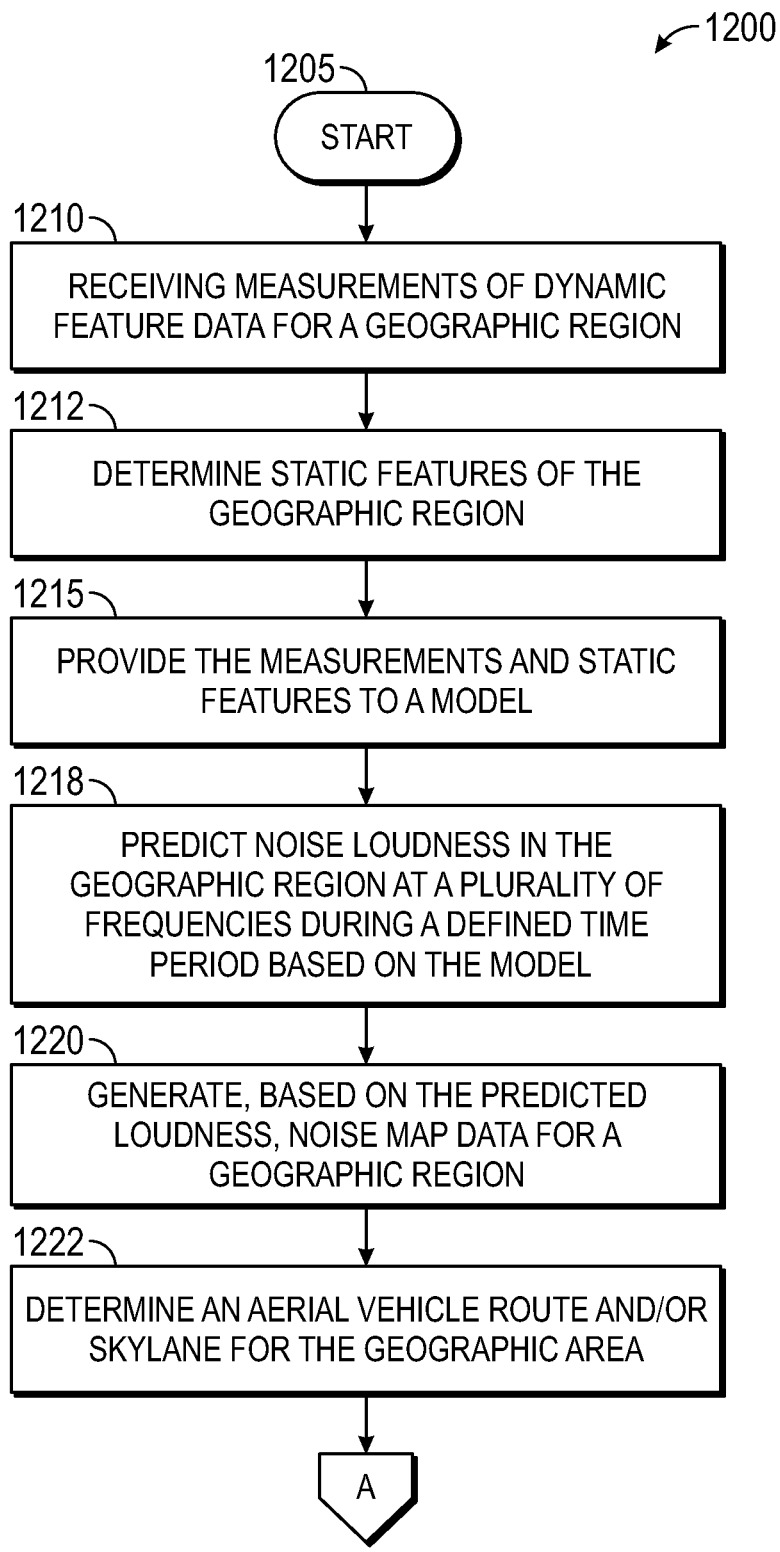

FIG. 12A is a flowchart of a process for predicting time varying loudness over multiple frequencies.

Figure 12B:
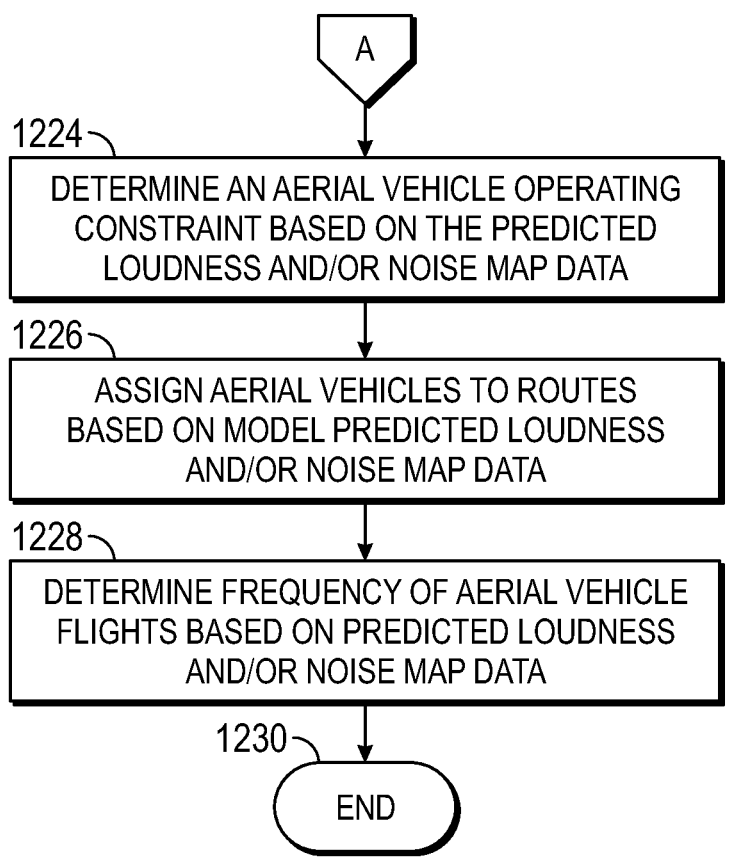

FIG. 12B is a continuation of the flowchart of FIG. 12A.

Figure 13:
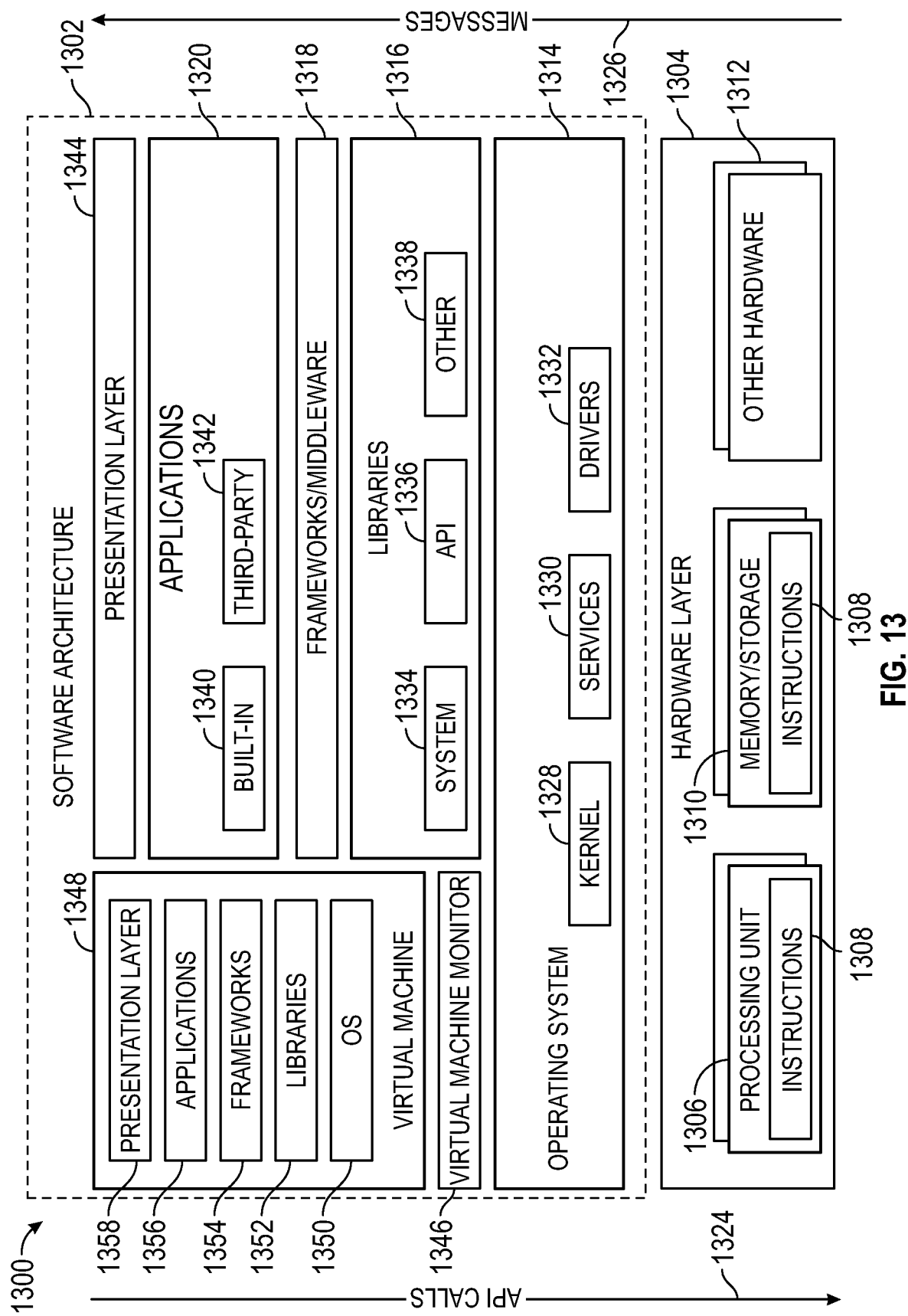

FIG. 13 is a block diagram showing one example of a software architecture for a computing device.

Figure 14:
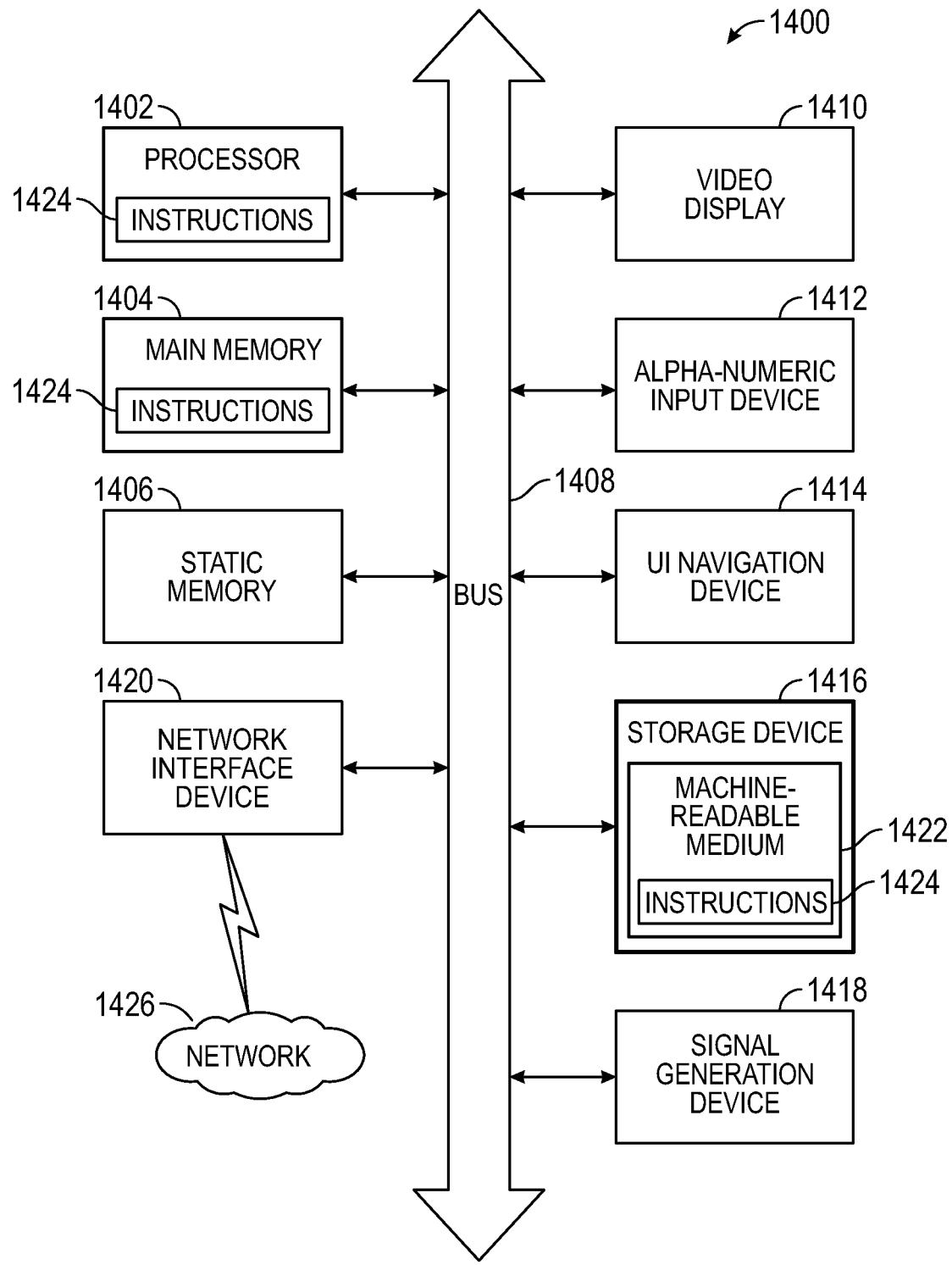

FIG. 14 is a block diagram illustrating a computing device hardware architecture.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

There are a variety of reasons to understand a noise profile of a geographic area. For example, a noise profile or noise level can determine a tolerance for additional noise to be introduced into the environment. Some government regulations require that proposed activity add no more than a defined percentage to an existing noise level. Thus, relatively quiet regions may be more difficult to operate within without violating these governmental requirements.

When planning operations, it can be challenging to understand a current noise environment. This may be especially true when planning aircraft operations, which cover large distances and have the potential to impact large geographic areas. Noise information for these vast areas is generally not available, making planning operations in these regions challenging. Thus, a technical problem is presented in that this lack of understanding of the noise environments in which an aircraft will be operating results. This technical problem results in assignment of aircraft routes which may adversely effect ground activities more than necessary. This can result in a need to reduce a level of flight activity below which might be supportable if the noise environment was better understood.

The disclosed embodiments solve this technical problem by providing a model that is able to predict time varying loudness levels across multiple frequencies for almost any geographic region for which a set of feature parameters are understood. To accomplish this, static and dynamic feature information for a plurality of regions is collected. Static feature information includes information such as elevation, percentage of vegetation in the region, distance from one or more roads, and other features of a geographic region that do not generally change over time, or at least change at a relatively slow rate. Dynamic feature information is also collected via deployment of a variety of sensors. Some sensors are configured to collect weather data in a region, including, for example, one or more of temperature, dewpoint, humidity, wind speed, wind direction, pressure, or other weather data. Other sensors collect noise information within the region. For example, noise sensors are configured to collect time varying loudness data on a plurality of frequencies. Other sensors record traffic amount and volume information. Traffic in this context includes, in various embodiments, but is not limited to, one or more of road traffic (bus, car, motorcycle, scooter, or other traffic), air traffic, and/or rail traffic. Each of the weather, noise, and traffic data is correlated with a time period in which the data is collected.

The static and dynamic feature data for each of a plurality of regions are used to train a model. A percentage of the feature data is withheld from the training set and then used to test accuracy levels of the model at predicting the noise data for a region. The results of these tests are described further below. Thus, the disclosed embodiments provide for prediction of loudness information for a geographic region over a plurality of time periods. Notably, the geographic region for which predictions are made does not necessarily need to be included in the training data. Further, predictions for time periods in the future, or at least after a most recent training data is collected, may also be provided by the disclosed embodiments. The data produced from the model can be used to generate noise map data for a particular geographic area. This can include, for example, the geographic area associated with the data input into the model or another geographic area (for which the model can predict loudness). Moreover, these predictions may be used for routing of aircraft through a geographic region (e.g., based on the noise map data). For example, noise predictions for the geographic region may be used to determine whether to route an aircraft through the region, at what altitude to route the aircraft, and/or at what times. For example, if a region has a relatively high level of predicted background loudness (e.g. background loudness above a predefined threshold), some embodiments route an aircraft at a lower altitude over the region than if the region has a relatively lower level of background loudness. (e.g. predicted background loudness lower than the predefined threshold or lower than a second predefined threshold). Some embodiments determine a minimum predicted background noise loudness along an aircraft route, and set an aircraft's altitude over the route based on the minimum. For example, if the minimum predicted background noise loudness along the route is below a predefined noise threshold, some embodiments set the aircraft's altitude along the route to be above a predefined altitude threshold (e.g. to minimize noise impact on relatively quiet areas). Urban planning may also be influenced by the model's predictions. For example, locations of and or hours of operation of airports and/or sky ports may be influenced based on predictions provided by the disclosed model.

A-weighted sound pressure level ($L_A$) alone may be inaccurate, in some cases, in estimating human perception of noise. $L_A$ was developed to gauge whether intentionally generated sounds, such as those made by a telephone was loud enough to achieve their intended purpose. However, $L_A$ does not measure whether a sound is bothersome to a human. Instead, loudness provides a better metric for tracking the subjective perception of sound pressure.

By examining loudness, instead of $L_A$, the disclosed embodiments are able to identify and account for certain types of acoustic nuance. For example, the disclosed embodiments provide some level-dependence of frequency weighting. Auditory reception behaves differently at different sound levels. Sound pressure levels are traditionally weighted along a curve in order to account for what humans can hear. Noises outside of our audible frequency range (20 Hz-20 kHz) are minimized or discounted by this weighting. A-weighting is designed to mimic human sensitivity to single tones at the level of soft human speech. Other weighting curves have been proposed for higher sound levels (at which humans are more sensitive to low and high frequency sound) but modern practice is to continuously adjust the weighting curve depending on level rather than use discrete steps.

Some of the disclosed embodiments further provide for spectral loudness summation. For example, two separate sounds can share the same level, but differences in spectrum will contribute to differences in loudness. Besides sensitivity variations with frequency, the ear is less sensitive to sounds that are close in pitch to stronger sounds, and is more sensitive to sounds some distance away in pitch.

Some embodiments consider a temporal shape of sound. In particular, some separate sounds share an equivalent level and spectrum, but can still be perceived very differently. Temporal shape contributes to the audibility of the sound, since humans have different integration times for onset and decay of sound events. Even if a particular sound is several decibels less in sound pressure than background noise, it can still stand out depending on how rapidly it changes.

Loudness can vary depending on a length of time for which it is recorded. For understanding how aircraft can blend into urban soundscapes, time-varying loudness (TVL) is of interest. TVL includes both short-term (rapid onset) and long-term (memory) reception in the auditory system, accounting for both the inertia of our physiological system (e.g., human neurons do not fire instantaneously), and the audibility of "pulses" like rotor blades. Even at lower dB(A) levels, helicopter sounds (for instance) are still audible and stand out from the urban soundscape. Averaging over longer durations (50 ms+) may obfuscate the audibility of pulse-type sounds, and make it more difficult to confidently ascertain if newly introduced noise blends into the ambient soundscape.

In order to measure a loudness increase contributed by an on-demand aircraft flight, a degree to which ambient sound masks the sound of the aircraft is measured. Ambient TVL versus time is considered for a plurality of spectral regions that will experience aircraft noise. Some embodiments analyze approximately thirty bands of frequencies. Some embodiments report an average loudness measurement over the entire frequency range. Data is generally collected, in at least some of the embodiments, within each frequency band.

All this is to say that simply relying on the average physical displacement of air as a proxy for noise would be an irresponsibly oversimplified success metric for our operation. A system would need to account for these nuances in measuring vehicular noise and map that against the same nuances in our urban soundscape.

Thus, the disclosed embodiments simultaneously inform the relative total loudness in a given location and the partial loudness due to the operation of flights. Of the several loudness metrics in common use, time-varying loudness is most informative for the applications contemplated by the disclosed embodiments. Specifically, time-varying loudness TVL given equivalent rectangular band i, location l and hour of day h should accurately capture the nuances of our distributed urban soundscape:

TVL(i,l,h)

For any given location and hour, TVL is integrated, in some embodiments, into equivalent loudness for that hour. As additional aircraft operations and flight routes are performed within a region, a TVL at these times and locations will change based on the perceived loudness of air operations relative to an existing soundscape. The disclosed embodiments capture this by measuring the delta in TVL between ambient sound and ambient sound after aircraft operations are introduced. Some embodiments perform these determinations for each spectral region.

Some embodiments also include a weighting factor to account for population density in a particular region and at a particular time of day, as below:

$$\text{weighted impact}(l,h) = \Delta \text{TVL}(l,h) * P(l,h)$$

Thus, the disclosed embodiments provide for establishing a baseline for TVL, which permits the calculation of total loudness with operations added. So TVL(i,l,h) will serve as our primary soundscape metric.

Figure 1:
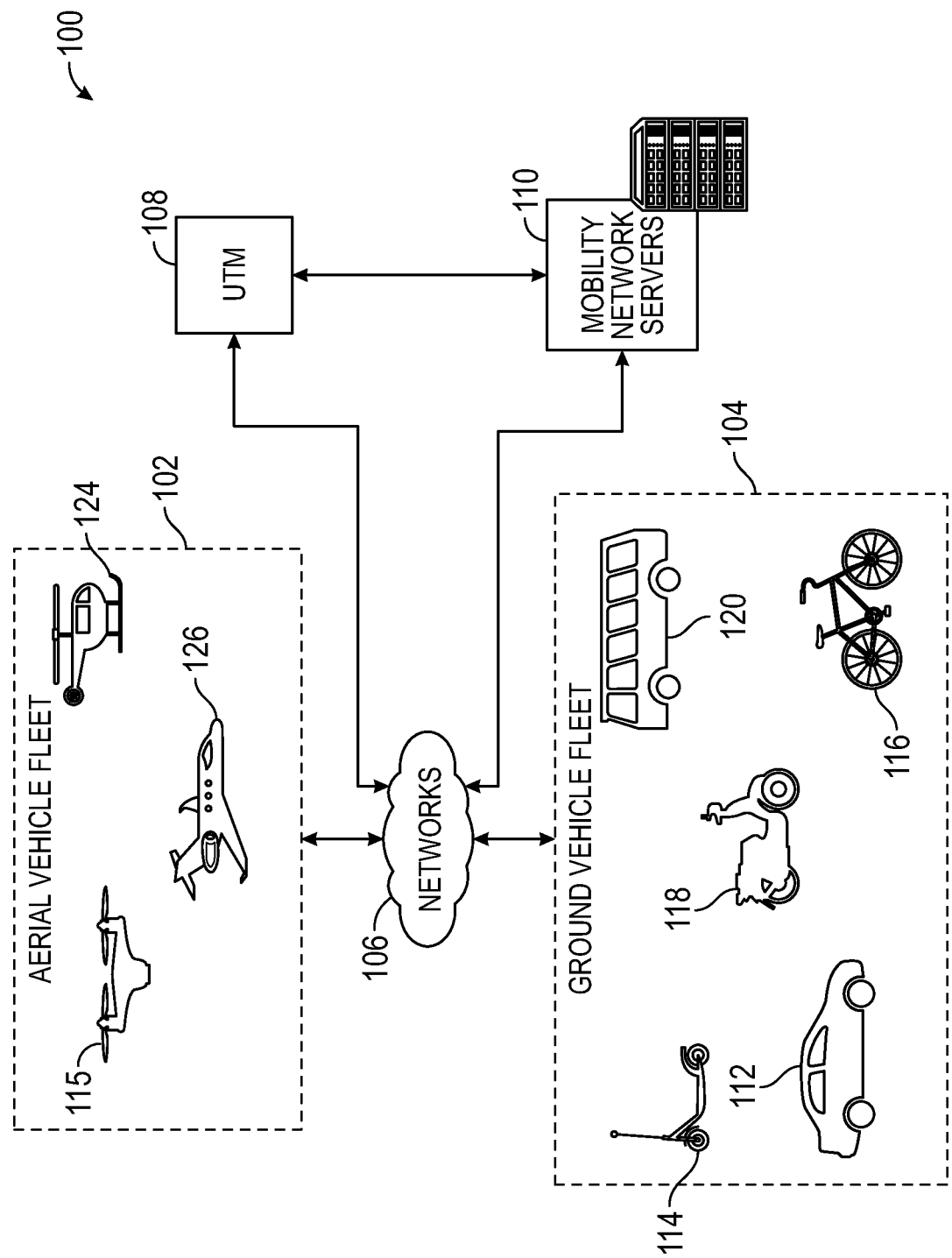
FIG. 1 illustrates a transportation environment 100 in accordance with one embodiment.

FIG. 1 is a schematic representation of a transportation environment 100, according to an example embodiment, in which an aerial vehicle fleet 102 and a ground vehicle fleet 104 provide mobility services (e.g., people transport, goods delivery).

Interactions, communications, and coordination of movement between vehicles of the aerial vehicle fleet 102 (e.g., vertical take-off and landing (VTOL) vehicles 115, helicopters 124 and aircraft 126) and the ground vehicle fleet 104 (e.g., automobiles 112, scooters 114, bicycles 116, motorbikes 118, and busses 120) are facilitated through one or more mobility network servers 110 that are coupled via various networks 106 both the aerial vehicle fleet 102 and ground vehicle fleet 104. Specifically, the mobility network servers 110 may coordinate the acquisition of data from the various sensors of vehicles of the aerial vehicle fleet 102 in order to control the routing and operations of various vehicles of the ground vehicle fleet 104. The mobility network servers 110 likewise coordinate the acquisition of data from various sensors are vehicles of the ground vehicle fleet 104 in order to control the routing and operations of vehicles of the aerial vehicle fleet 102. For example, the mobility network servers 110 may control the acquisition of traffic monitoring data, by the aerial vehicle fleet 102, in order to assist in routing of vehicles of the ground vehicle fleet 104 by a routing engine that forms part of the mobility network servers 110.

The mobility network servers 110 is also coupled to an unmanned aerial vehicle traffic management system (UTM) 108, which operates to provide aircraft traffic management and de-confliction services to the aerial vehicle fleet 102. In one embodiment, the UTM 108 provides airspace management that various altitudes up to several thousand feet. The UTM 108 may also provide high-volume voiceless air traffic control interactions, and also integrates with air traffic control systems associated with airports. The mobility network servers 110 use connections provided by the UTM 108 to communicate with the vehicles of the aerial vehicle fleet 102, passing along routing and other information.

The acquisition of data for traffic monitoring, for example, by the aerial vehicle fleet 102 may be based on the aerial vehicles fly trips predetermined and/or optimized by an UTM network. Connection to the UTM 108 is facilitated across multiple communications frequencies as needed for operation. Onboard telemetry of vehicles in the aerial vehicle fleet 102 is supplemented with GPS data in addition to other communication streams (GPS, 5G, etc.).

The UTM 108 is connected to the mobility network servers 110 that manage/oversee the operations of ground vehicles. The UTM 108 further communicates with third-party UAS Service Suppliers (USS) and supplemental data service providers (SDSPs) to facilitate the transfer of data to these third-party services.

The mobility network servers 110 further perform predetermination and/or optimization of trips of the aerial vehicle fleet 102 are based, for example, on the payload to be transported from a departing location to an arrival location (e.g., vertiport, fiducial, ad-hoc location). For example, flights by the aerial vehicle fleet 102 may be optimized to increase overall throughput, and thus efficiency of the system. Aircraft 126 and vertical take-off and landing (VTOL) vehicles such as a VTOL vehicle 115 and/or a helicopter 124 may fly within dynamically allocated routes and sky lanes which enable safe, dense operation at scale. Allocation of these routes/sky lanes is determined by the mobility network servers 110 based on environmental acceptance (e.g., noise), weather, airspace deconfliction, and operational relevancy.

The aerial vehicles of the aerial vehicle fleet 102 can include human controlled aerial vehicles. For instance, a vehicle operator (e.g., pilot) can be located within the aerial vehicle to control the aerial vehicle. In some implementations, the vehicle operator can be located at a remote location and utilize a computing device presenting a user interface to remotely control the aerial vehicle.

Figure 2:
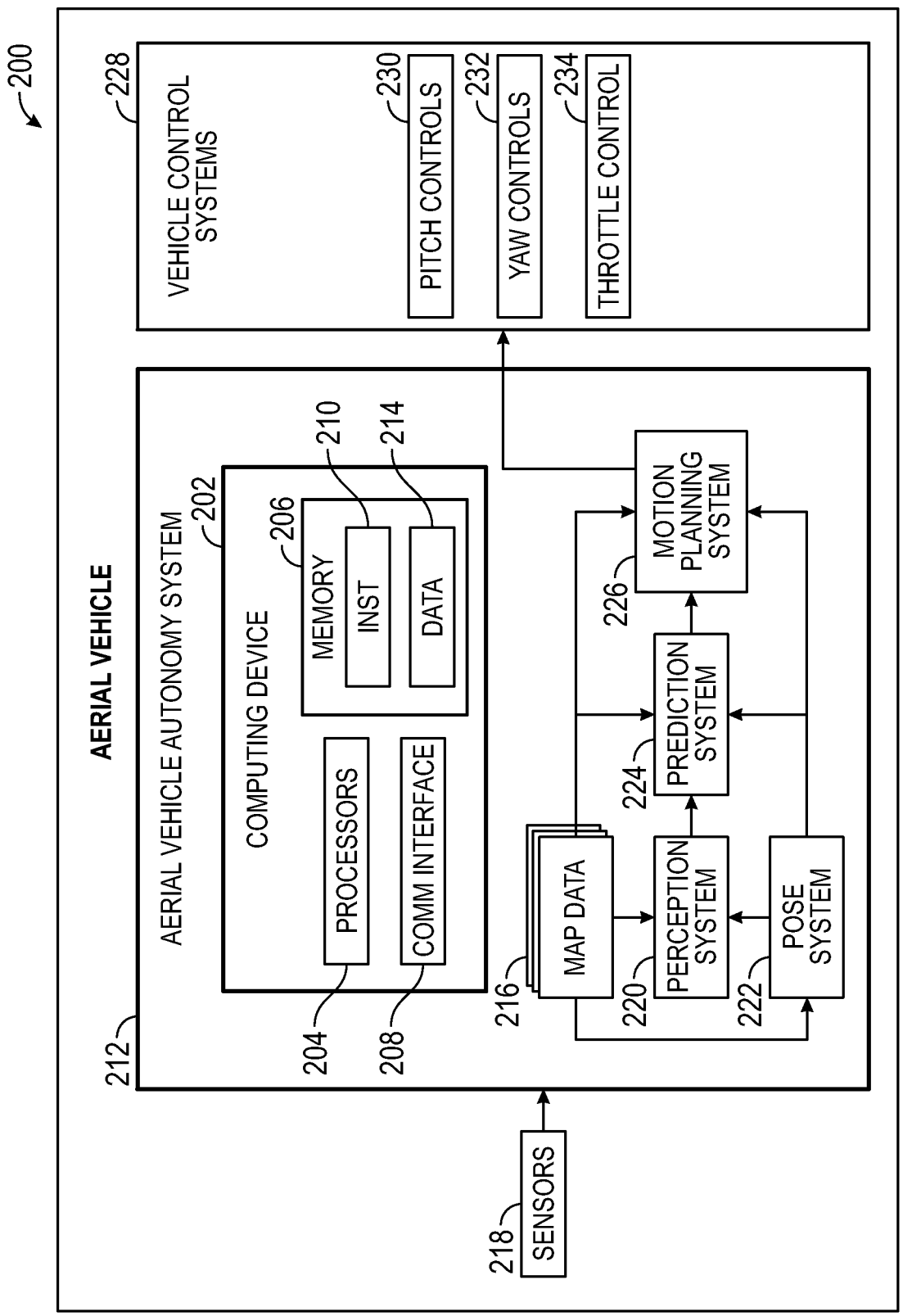
FIG. 2 is a diagrammatic representation of an autonomous vehicle system, in accordance with some example embodiments.

In some implementations, the aerial vehicle fleet 102 can include autonomous aerial vehicles. FIG. 2 depicts a block diagram of an aerial vehicle 200, according to example aspects of the present disclosure. The aerial vehicle 200 can be, for example, be an autonomous or semi-autonomous aerial vehicle. The aerial vehicle 200 includes one or more sensors 218, an aerial vehicle autonomy system 212, and one or more vehicle control systems 228.

The aerial vehicle autonomy system 212 can be engaged to control the aerial vehicle 200 or to assist in controlling the aerial vehicle 200. In particular, the aerial vehicle autonomy system 212 receives sensor data from the sensors 218, attempts to comprehend the environment surrounding the aerial vehicle 200 by performing various processing techniques on data collected by the sensors 218 and generates an appropriate motion path through an environment. The aerial vehicle autonomy system 212 can control the one or more vehicle control systems 228 to operate the aerial vehicle 200 according to the motion path.

The aerial vehicle autonomy system 212 includes a perception system 220, a prediction system 224, a motion planning system 226, and a pose system 222 that cooperate to perceive the surrounding environment of the aerial vehicle 200 and determine a motion plan for controlling the motion of the aerial vehicle 200 accordingly.

Various portions of the aerial vehicle autonomy system 212 receive sensor data from the sensors 218. For example, the sensors 218 may include remote-detection sensors as well as motion sensors such as an inertial measurement unit (IMU), one or more encoders, or the like. The sensor data can include information that describes the location of objects within the surrounding environment of the aerial vehicle 200, information that describes the motion of the vehicle, and so forth.

The sensors 218 may also include one or more remote-detection sensors or sensor systems, such as a LIDAR, a RADAR, one or more cameras, etc. As one example, a LIDAR system of the sensors 218 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system of the sensors 218 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 218 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 218 can include a positioning system. The positioning system can determine a current position of the aerial vehicle 200. The positioning system can be any device or circuitry for analyzing the position of the aerial vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the aerial vehicle 200 can be used by various systems of the aerial vehicle autonomy system 212.

Thus, the sensors 218 can be used to collect sensor data that includes information that describes the location (e.g., in three-dimensional space relative to the aerial vehicle 200) of points that correspond to objects within the surrounding environment of the aerial vehicle 200. In some implementations, the sensors 218 can be located at various different locations on the aerial vehicle 200. As an example, one or more cameras, RADAR and/or LIDAR sensors.

The pose system 222 receives some or all of the sensor data from the sensors 218 and generates vehicle poses for the aerial vehicle 200. A vehicle pose describes the position (including altitude) and attitude of the vehicle. The position of the aerial vehicle 200 is a point in a three-dimensional space. In some examples, the position is described by values for a set of Cartesian coordinates, although any other suitable coordinate system may be used. The attitude of the aerial vehicle 200 generally describes the way in which the aerial vehicle 200 is oriented at its position. In some examples, attitude is described by a yaw about the vertical axis, a pitch about a first horizontal axis and a roll about a second horizontal axis. In some examples, the pose system 222 generates vehicle poses periodically (e.g., every second, every half second, etc.) The pose system 222 appends time stamps to vehicle poses, where the time stamp for a pose indicates the point in time that is described by the pose. The pose system 222 generates vehicle poses by comparing sensor data (e.g., remote sensor data) to map data 216 describing the surrounding environment of the aerial vehicle 200.

In some examples, the pose system 222 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 222 generates vehicle poses. Accordingly, the pose filter generates some vehicle poses by extrapolating from a previous pose estimates.

The perception system 220 detects objects in the surrounding environment of the aerial vehicle 200 based on the sensor data, the map data 216 and/or vehicle poses provided by the pose system 222. The map data 216, for example, may provide detailed information about the surrounding environment of the aerial vehicle 200. The map data 216 can provide information regarding: the route(s) and/or skylane(s) that the aerial vehicle 200 is to traverse, route(s) and/or skylanes; the position of other aerial vehicles; the location, attitude, orientation, and/or other parameters of vertiports or landing zones, weather data (e.g., weather radar data), noise map data and/or any other map data that provides information that assists the aerial vehicle autonomy system 212 in comprehending and perceiving its surrounding environment and its relationship thereto. The prediction system 224 uses vehicle poses provided by the pose system 222 to place aerial vehicle 200 environment.

In some examples, the perception system 220 determines state data for objects in the surrounding environment of the aerial vehicle 200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the aerial vehicle 200; minimum path to interaction with the aerial vehicle 200; minimum time duration to interaction with the aerial vehicle 200; and/or other state information.

In some implementations, the perception system 220 can determine state data for each object over a number of iterations. In particular, the perception system 220 can update the state data for each object at each iteration. Thus, the perception system 220 can detect and track objects, such as vehicles, that are proximate to the aerial vehicle 200 over time.

The prediction system 224 is configured to predict future positions for an object or objects in the environment surrounding the aerial vehicle 200 (e.g., an object or objects detected by the perception system 220). The prediction system 224 can generate prediction data associated with objects detected by the perception system 220. In some examples, the prediction system 224 generates prediction data describing each of the respective objects detected by the perception system 220.

Prediction data for an object can be indicative of one or more predicted future locations of the object. For example, the prediction system 224 may predict where the object will be located within the next 5 seconds, 20 seconds, 200 seconds, etc. Prediction data for an object may indicate a predicted trajectory (e.g., predicted path) for the object within the surrounding environment of the aerial vehicle 200. For example, the predicted trajectory (e.g., path) can indicate a path along which the respective object is predicted to travel over time (and/or the speed at which the object is predicted to travel along the predicted path). The prediction system 224 generates prediction data for an object, for example, based on state data generated by the perception system 220. In some examples, the prediction system 224 also considers one or more vehicle poses generated by the pose system 222 and/or the map data 216.

In some examples, the prediction system 224 uses state data indicative of an object type or classification to predict a trajectory for the object. As an example, the prediction system 224 can use state data provided by the perception system 220 to determine that particular object (e.g., an object classified as a vehicle). The prediction system 224 can provide the predicted trajectories associated with the object(s) to the motion planning system 226.

In some implementations, the prediction system 224 is a goal-oriented prediction system that generates potential goals, selects the most likely potential goals, and develops trajectories by which the object can achieve the selected goals. For example, the prediction system 224 can include a scenario generation system that generates and/or scores the goals for an object and a scenario development system that determines the trajectories by which the object can achieve the goals. In some implementations, the prediction system 224 can include a machine-learned goal-scoring model, a machine-learned trajectory development model, and/or other machine-learned models.

The motion planning system 226 determines a motion plan for the aerial vehicle 200 based at least in part on the predicted trajectories associated with the objects within the surrounding environment of the aerial vehicle 200, the state data for the objects provided by the perception system 220, vehicle poses provided by the pose system 222, and/or the map data 216. Stated differently, given information about the current locations of objects and/or predicted trajectories of objects within the surrounding environment of the aerial vehicle 200, the motion planning system 226 can determine a motion plan for the aerial vehicle 200 that best navigates the aerial vehicle 200 relative to the objects at such locations and their predicted trajectories on acceptable routes.

In some implementations, the motion planning system 226 can evaluate cost functions and/or one or more reward functions for each of one or more candidate motion plans for the aerial vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 226 can determine a total cost (e.g., a sum of the cost(s) and/or reward(s) provided by the cost function(s) and/or reward function(s)) of adhering to a particular candidate pathway. The motion planning system 226 can select or determine a motion plan for the aerial vehicle 200 based at least in part on the cost function(s) and the reward function(s). For example, the motion plan that minimizes the total cost can be selected or otherwise determined. The motion plan can be, for example, a path along which the aerial vehicle 200 will travel in one or more forthcoming time periods. In some implementations, the motion planning system 226 can be configured to iteratively update the motion plan for the aerial vehicle 200 as new sensor data is obtained from the sensors 218. For example, as new sensor data is obtained from the sensors 218, the sensor data can be analyzed by the perception system 220, the prediction system 224, and the motion planning system 226 to determine the motion plan.

Each of the perception system 220, the prediction system 224, the motion planning system 226, and the pose system 222, can be included in or otherwise a part of the aerial vehicle 200 configured to determine a motion plan based on data obtained from the sensors 218. For example, data obtained by the sensors 218 can be analyzed by each of the perception system 220, the prediction system 224, and the motion planning system 226 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 226 can provide the motion plan to vehicle control systems 228 to execute the motion plan. For example, the vehicle control systems 228 can include pitch control module 230, yaw control module 232, and a throttle control system 234, each of which can include various vehicle controls (e.g., actuators or other devices or motors that control power) to control the motion of the aerial vehicle 200. The various vehicle control systems 228 can include one or more controllers, control devices, motors, and/or processors.

A throttle control system 234 is configured to receive all or part of the motion plan and generate a throttle command. The throttle command is provided to an engine and/or engine controller, or other propulsion system component to control the engine or other propulsion system of the aerial vehicle 200.

The aerial vehicle autonomy system 212 includes one or more computing devices, such as the computing device 202 which may implement all or parts of the perception system 220, the prediction system 224, the motion planning system 226 and/or the pose system 222. The example computing device 202 can include one or more processors 204 and one or more memory devices (collectively referred to as memory 206). The processors 204 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 206 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 206 can store data 214 and instructions 210 which can be executed by the processors 204 to cause the aerial vehicle autonomy system 212 to perform operations. The computing device 202 can also include a communications interface 208, which can allow the computing device 202 to communicate with other components of the aerial vehicle 200 or external computing systems, such as via one or more wired or wireless networks. Additional descriptions of hardware and software configurations for computing devices, such as the computing device 202 are provided herein.

Figure 3:
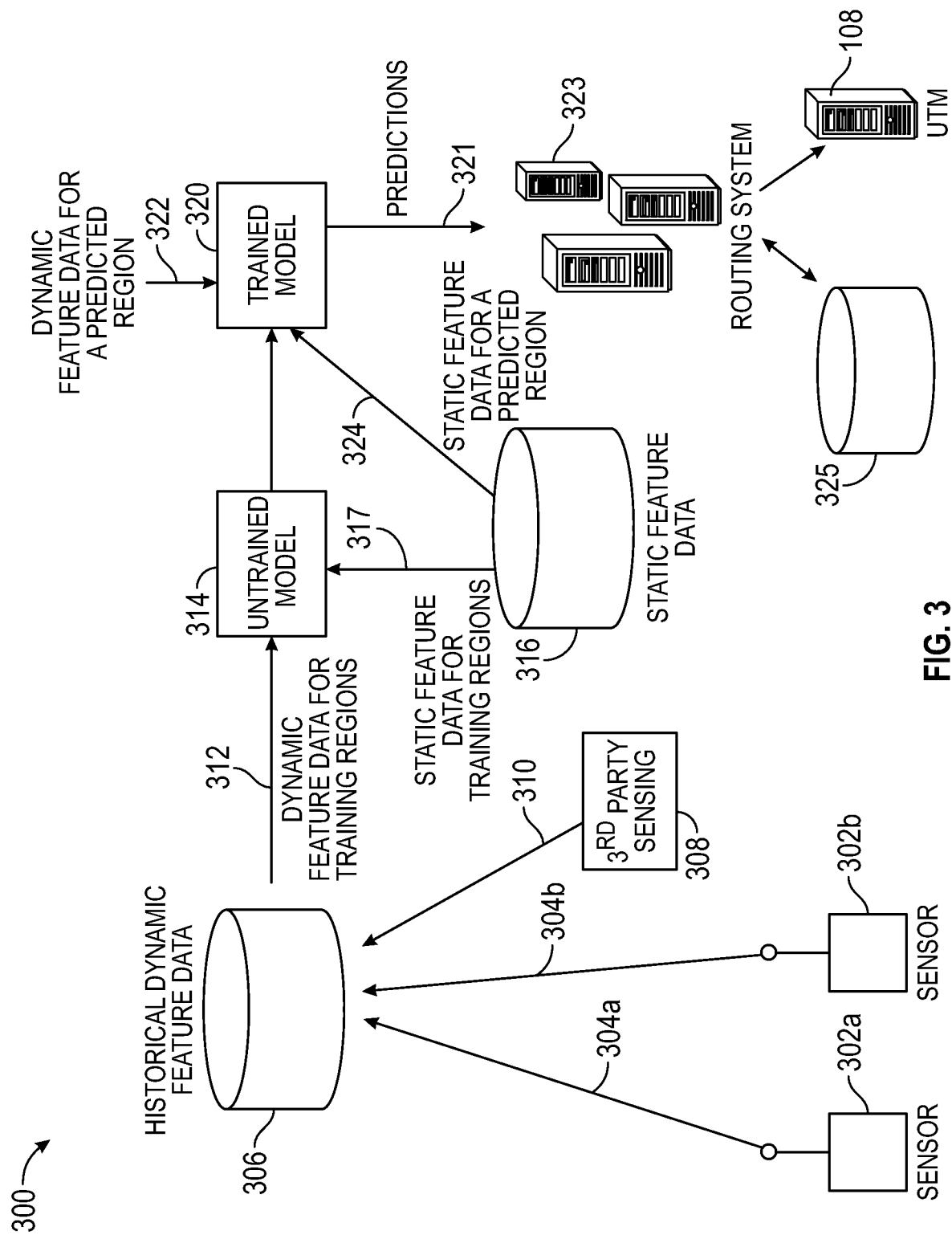
FIG. 3 is an overview diagram of data flow in one or more of the disclosed embodiments.

FIG. 3 is an overview diagram of data flow 300 through a computer system in one or more of the disclosed embodiments. FIG. 3 shows two dynamic feature sensors 302a-b. The dynamic feature sensors 302a-b may sense features of a geographical region in which the sensors are placed. For example, some of the dynamic feature sensors 302a-b may sense weather information within the respective geographic region. Weather information may include temperature, dew point, humidity, wind speed, wind direction, precipitation rate or intensity, barometric pressure, or other weather information. Other dynamic feature sensors 302a-b may also be configured to sense dynamic features of a man-made origin. For example, the dynamic feature sensors 302a-b may be configured to sense sound pressure levels and/or loudness at multiple frequencies. The dynamic feature sensors 302a-b, such as traffic sensors, sense dynamic features (such as traffic levels) at multiple points over time, and send the sensed information 304a and sensed information 304b along with an indication of when the information is collected, to a historical dynamic feature data store 306.

Third-party sensors 308 may also be relied upon to provide information 310 to the historical dynamic feature data store 306. For example, third-party traffic sensors may detect an amount and speed of air, road, rail, or other traffic in a region over time and send the information to the historical dynamic feature data store 306.

In some aspects, sensors may not be used to obtain information on dynamic features. Instead, in these aspects, some of this information may be obtained from other sources. For example, some third-party organizations make APIs (e.g. Darksky) or files available that provide recorded weather information for a region or regions. Thus, some embodiments may make use of this existing dynamic feature information to populate the historical dynamic feature data store 306.

The historical dynamic feature data store 306 accumulates the historical information 304a-b and 310 over time. This historical information 312 is then used to train an untrained model 314. The untrained model 314 and trained model 320 represented in FIG. 3 both include, in some embodiments, either alone or in combination, computing hardware and software. For example, in some embodiments, the untrained model 314 and/or 320 include one or more of the hardware components discussed below with respect to FIG. 14. The untrained model 314 and/or 320 also include, in these embodiments, instructions that configure hardware processing circuitry (e.g. the processor 1402 discussed below) to perform one or more of the functions attributed to the untrained model 314 and/or trained model 314 respectively, as discussed below. In some embodiments, one or more of the untrained model 314 and/or the trained model 320 are integrated into the routing system 323, discussed below.

Additional information regarding geographic regions identified in the historical information 312 is provided by a static feature data store 316. The static feature data store 316 stores static information for geographic regions. The static information may include, for example, elevation, topography, percentage vegetation, distance from one or more roads, highways, or air navigation corridors. Static feature information for the region used to train the untrained model 314 are also provided to the untrained model 314 as static feature information 317.

After training of the untrained model 314, a trained model 320 is available. The trained model 320 generates noise predictions 321 for a region. The predictions may include predictions for time varying loudness over multiple frequencies. The trained model generates the predictions for a region based on dynamic feature data 322 for the region and static feature information 324 for the region.

The noise predictions 321 are provided, in some embodiments, to the routing system 323. The routing system 323 stores the predictions generated by the trained model 320 in a datastore 325. In some of the disclosed embodiments, the routing system 323 further processes the noise predictions 321 made by the trained model 314 to generate noise map data. For example, the routing system 323 generates noise information for a plurality of regions based on the noise predictions 321. This plurality of regions forms a map in some embodiments. Some embodiments of the routing system 323 further generate a plurality of routes for an aircraft based on the noise predictions 321. For example, the routing system 323 generates, in some embodiments, a plurality of routes from an origin location to a destination location for an aircraft flight. The routing system 323 then, in some embodiments, compares the background information for each of the plurality of routes to determine which of the routes is to be used for the aircraft flight. In some embodiments, background noise loudness of each region included in a route is aggregated. The aggregated noise for a plurality of different routes is then compared to determine which route to select for the aircraft flight. For example, some embodiments select a route having the highest aggregated noise based on the comparison.

The aircraft flight's altitude is also in some cases selected based on the background noise loudness predicted along a route, with less noisy routes (below a first predefined noise threshold) causing the aircraft altitude to be set to a higher value (above a first predefined altitude threshold) while more noisy routes (above a second predefined noise threshold) result in a lower altitude (below a second predefined altitude threshold). In some embodiments, the first predefined altitude threshold and the second predefined altitude threshold are equivalent. In some embodiments, the first predefined noise threshold and the second predefined noise threshold are equivalent.

In some embodiments, once a route is selected, the routing system 323 sends information defining the selected route to the UTM 108, which is discussed above.

Figure 4A:
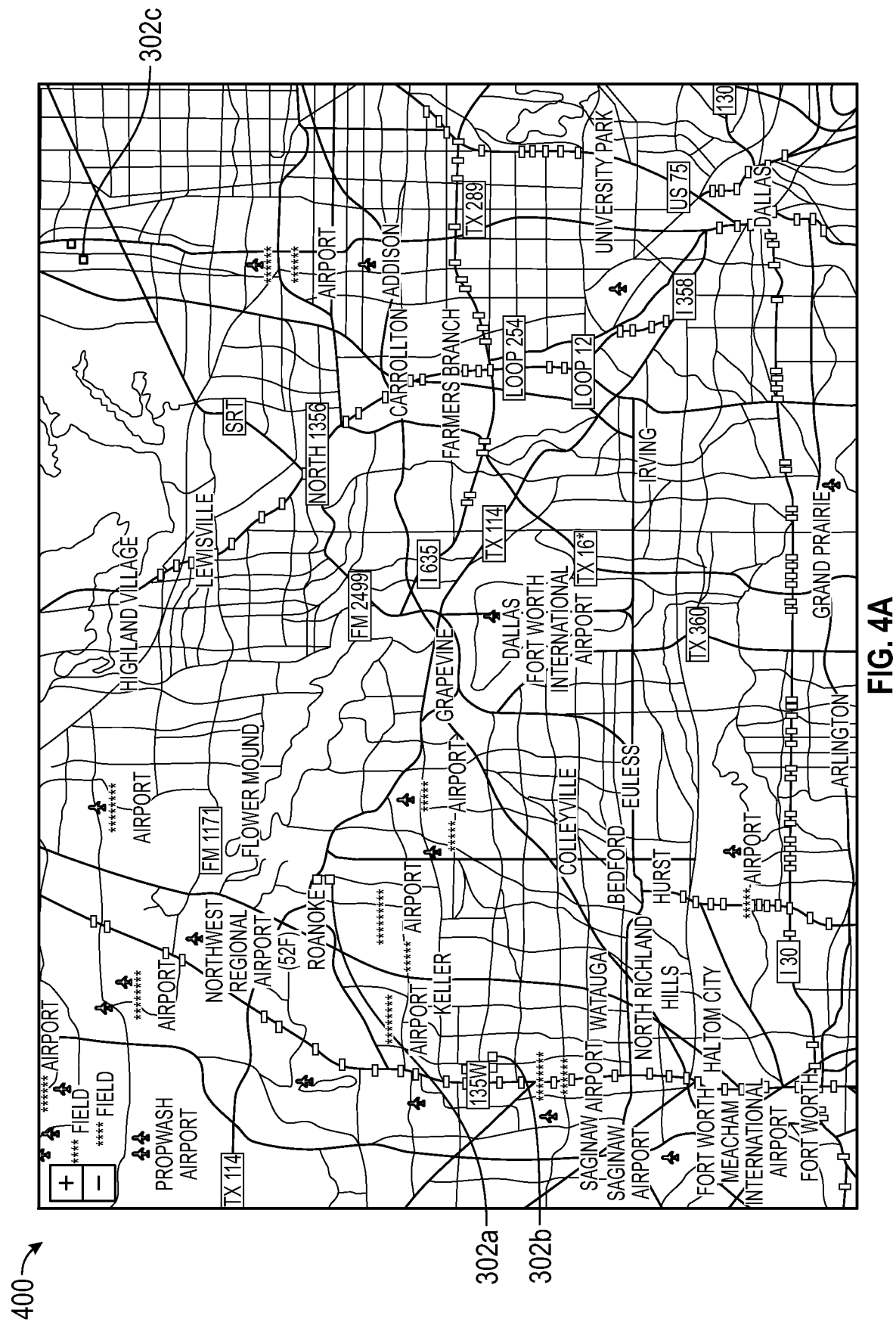
FIGS. 4A and 4B show noise measurement locations in a metropolitan area.
Figure 4B:
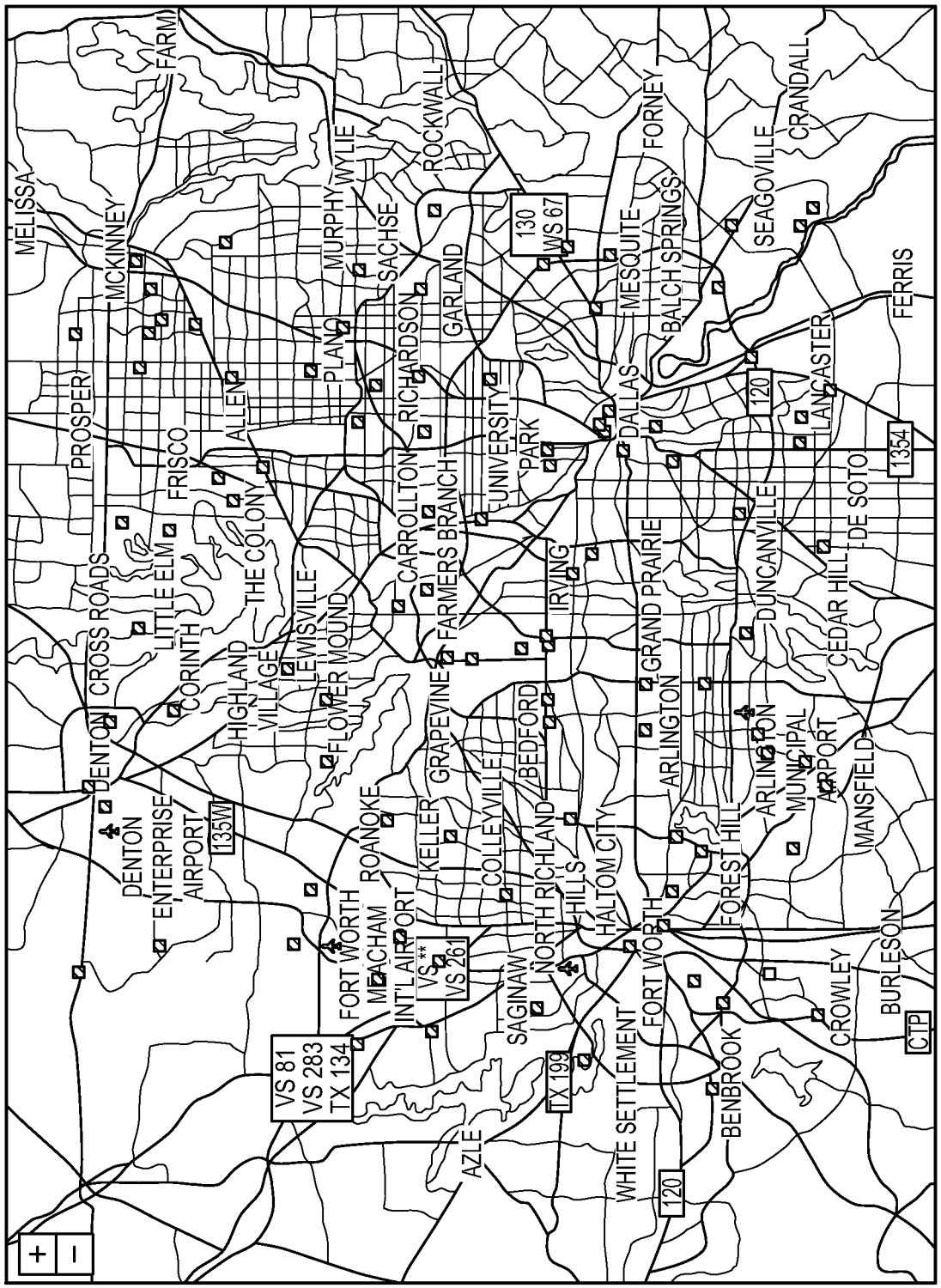

FIGS. 4A and 4B show noise measurement locations in a metropolitan area. The noise measurements collected can be used to train a model that predicts noise as further described below. A map 400 shown in FIG. 4A includes noise measurement devices, examples of which are marked as 402a-c. FIG. 4B shows a map 450 indicating locations of noise measurement devices in a metropolitan area. The noise measurement devices can be configured to measure time varying loudness at least every second. The measurement devices can be positioned in the geographic region so as to capture variations and correlation with nearby highway traffic. Some measurement devices are mounted at fixed locations and sample sound pressure, in some cases at 32,000 times per second. This sound pressure data may be applied in offline analysis into fractional octave pressure and loudness data. Some measurement devices are mounted on portable platforms, that can be repositioned in diverse neighborhoods. The portable platform measurement devices can be configured to collect 1/3 octave band level data and internally process 1/12 octave band loudness data once per second. This is increased fidelity collection compared to previous 1/3 octave or A-weighted collection methods, which have traditionally used averaging times of one minute or longer.

The loudness data may be collected in tenths of phon. The measurement devices may be further configured to collect 1/4-Cam (Cambridge) specific loudness (1/4 Cam is approximately equivalent to 1/12 octave." These measurements may be used to illustrate a loudness spectrum. Sound pressure level (SPL) levels may also be collected. For example, the measurement devices may be configured to collect SPL at each 1/3 octave band.

Previous work has used sound pressure level to measure noise. As explained above, SPL does not accurate measure whether humans find a sound annoying. Loudness measurements such as those in International Organization for Standardization (ISO) 532-3 (e.g., Cambridge based loudness measurement and more advanced metrics incorporating loudness) are a better method for tracking the perception of sound because these metrics consider several factors.

These factors include level-dependence of frequency weighting. Sound pressure levels are traditionally weighted along a curve in order to account for a human hearing range. Auditory reception behaves differently at different sound levels.

Another factor not considered by use of SPL is spectral loudness summation: Two separate sounds can share the same level, but differences in spectrum may contribute to differences in loudness. Besides sensitivity variations with frequency, and human hearing is less sensitive to frequencies that are close to frequencies already stronger in the overall sound, and more sensitive to frequencies that are further away from stronger spectral components.

Another factor not considered by SPL is a temporal shape of sound: Separate sounds may share an equivalent level and spectrum, but may still be perceived very differently. For example, if a particular sound is several decibels less in sound pressure than background noise, the sound may still stand out depending on its temporal shape.

In contrast, stationary or time-varying loudness metrics, derived from work at Cambridge University, includes measurements of both short-term (rapid onset) and long-term (memory) reception in the auditory system. These measurements account for both the inertia of the human physiological system (human neurons don't fire instantaneously), and the audibility of "pulses" such as rotor blades. Number and magnitude of events is also important in perception, and thus an intermittency ratio can play a role in gauging perceived acoustic exposure. One model of loudness was proposed in Moore B. C. J., Glasberg B. R. (1996) *A revision of Zwicker's loudness model*. Acustica United with Acta Acustica 82: 335-345. The loudness model was further updated in 2006 in Glasberg B R, Moore B C, *Prediction of absolute thresholds and equal-loudness contours using a modified loudness model*, J Acoust Soc Am. 2006 August; 120(2): 585-8. Time varying loudness (TVL) was described in Stone M. A., Glasberg B. R., Moore B. C. J., Dynamic aspects of loudness: *A real-time loudness meter*. British Journal of Audiology 30: 124 (1996). This was further extended in Glasberg B. R., Moore B. C. J., *A model of loudness applicable to time-varying sounds*. Journal of the Audio Engineering Society 50: 331-342 (2002).

The measurement devices discussed above have the capability to measure Cambridge based time varying loudness at least every second. Data collected from several locations is used by the disclosed embodiments for a training set. The training set is used to build a loudness predictive model. The loudness predictive model predicts a noise magnitude at any instant in the day based on other inputs including weather, traffic volume, traffic speed, and distance from a road (e.g. highway).

Figure 5:
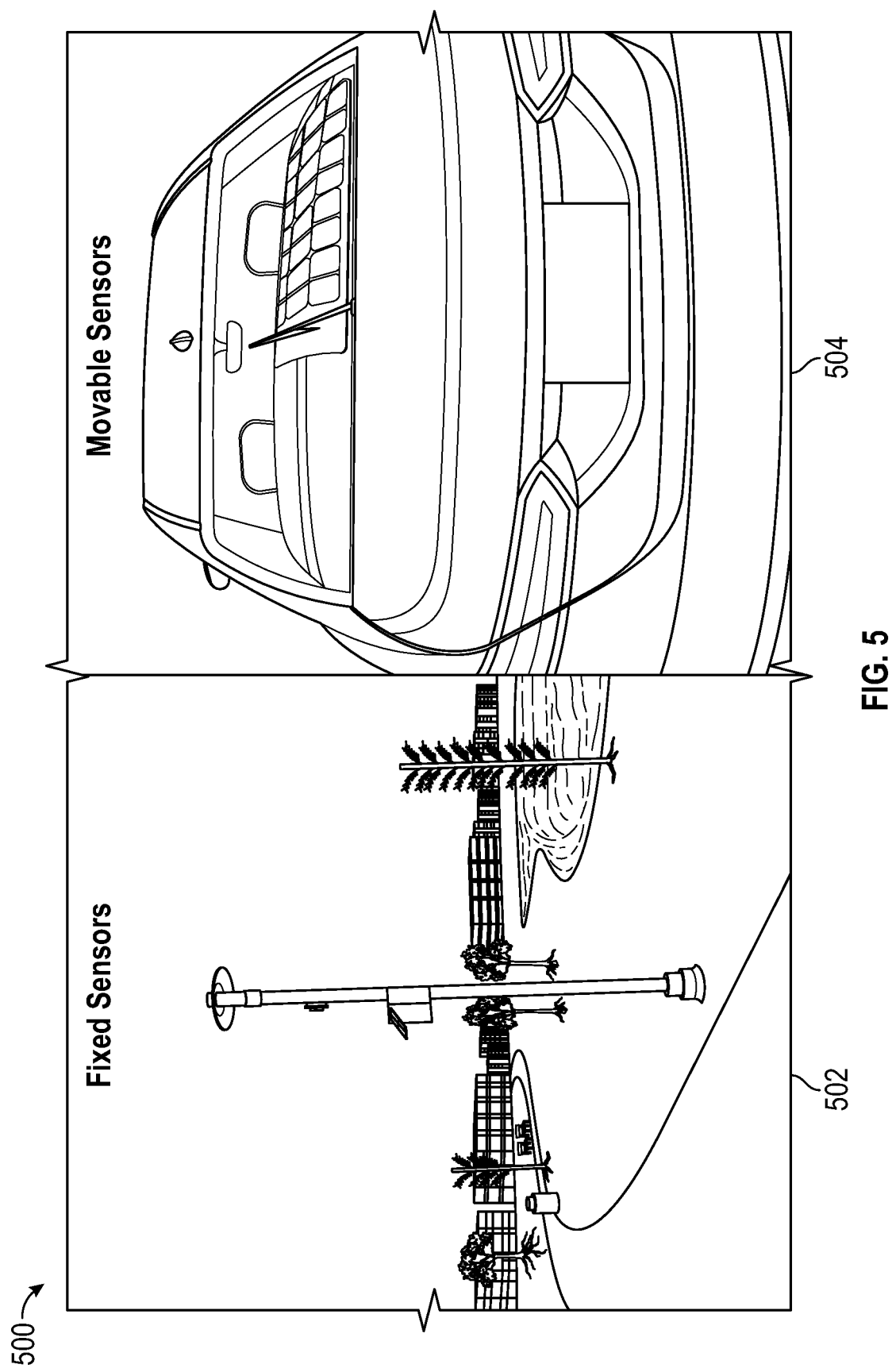
FIG. 5 shows two examples of noise sensors used to collect noise measurements in at least some of the disclosed embodiments.

FIG. 5 shows two example noise measurement devices that are implemented by one or more of the disclosed embodiments. FIG. 5 shows a fixed noise measurement device 502 and a moveable noise measurement device 504. Example movable sensors have characteristics including A weatherproof omnidirectional microphone that is installed on a lip of a trunk of an automobile along with a solar panel on the roof or the trunk lid. Some microphones used by the disclosed embodiments have the characteristics shown in Table 1 below:

TABLE 1

| Item | Specification |
|---|---|
| Frequency Range | 698-960 MHz, 1710-2700 MHz |
| Polarization | Vertical |
| Pattern | Omnidirectional |
| Cable & Mount | MB195 |
| Terminations | NMO or P-Mount w/Type N(f) |
| Operating Temperature | −40° C. to 85° C. |

A system enclosure of some embodiments has two XLR connectors and a pass-through for a USB cable to an LTE modem. One connector is attached to the microphone, the other to the solar panel. Some embodiments include is a switch that controls power to the data system.

A microphone signal is provided to a USB analog-to-digital converter, which is attached to a USB port of a computing device (e.g. Raspberry Pi 3B microcontroller) in some embodiments.

Software is installed on a SD card of the computing device, (e.g. running Raspbian Jesse. The solar panel provides power to a charge controller which delivers programmed charge current to an 18AH Odyssey PC680 motorsport/light aircraft battery in some embodiments.

The charge controller incorporates a low voltage disconnect to prevent the battery from being discharged below about 11 volts. Battery capacity can be greatly reduced if the battery experiences even one deep discharge. The battery (via a switch on the outer housing) feeds a switch-mode power supply that provides 5.3 volts to the computing device, in at least some embodiments.

Accuracy of predictions provide by the model is improved via the collection of noise data from acoustically different sites. These different sites should still maintain a set of covariates consistent with a geographic region for which predictions will be made. Examples of covariates, one or more of which are employed in various embodiments, in collection of model training data are shown in Table 2 below:

TABLE 2

| Name | Description |
| --- | --- |
| Distance from airports | Indicates proximity to private and public airports. |
| Distance from railroads | Indicates proximity to railroads. Use in conjunction with railroad activities by time of day in at least some embodiments. |
| Distance from roadways | Indicates proximity to roadways. Use in conjunction with road density by time of day, vehicle type, and vehicle speed. |
| Distance from military flight paths | Indicates proximity to military air traffic |
| Population density by time of day | Indicates population density in different parts of the city at different times of the day. For example, a residential area is likely busier on weekends while a commercial zone is likely business during business hours. |
| Flight density by time of day (air traffic) | Indicates variability in air traffic over time. |
| Number of airport enplanements by time of day | Indicates variability in noise generated by airport operations over time. This variable is used, in some embodiments, in conjunction with an indication of a proximity to said airport. In some embodiments, this variable is provided via a number of expected takeoffs and landings from the airport during time periods spanning a day.. |
| Railroad operations density by time of day | Indicates variability in noise generated by freight rail (class I) operations over time. In some embodiments, this indication is used in conjunction with proximity to said railroad. |
| Road density by time of day, vehicle type, and speed (traffic) | Indicates variability in vehicle traffic throughout the day. Where accessible, use publicly available traffic proportions by vehicle type and speed. |
| Proportion of barren land cover | Indicates percent barren land in region of interest. Preferred granularity of 200 meters. |
| Proportion of developed land cover | Indicates percent developed land in region of interest. Preferred granularity of 200 meters. |
| Proportion of forested land cover | Indicates percent forested land in region of interest. Preferred granularity of 200 meters. |
| Proportion of shrubland cover | Indicates percent shrubland in region of interest. Preferred granularity of 200 meters. |
| Proportion of wetland cover | Indicates percent wetland in region of interest. Preferred granularity of 200 meters. |
| Distance from water bodies (coast, stream, etc.) | Indicates straight line distance to water body in region of interest. Preferred granularity of 200 meters. |
| Humidity levels by time of day | Dynamic explanatory variable accounting for differences in air pressure and humidity, which impacts atmospheric acoustic absorption. |
| Precipitation by time of day | Dynamic covariate accounting for rainfall. |
| Elevation | Indicates atmospheric density, which impacts sound absorption. |
| Wind speed by time of day | Dynamic covariate accounting for wind. |
| Atmospheric pressure by time of day | Dynamic covariate accounting for atmospheric pressure. Atmospheric pressure affects sounds' ability to travel through the air. |

FIG. 6A. shows observations 600 collected via the measurement devices described above. These observations show that, at many locations, noise levels vary significantly throughout the day and for a weekend versus a weekday, as shown in FIG. 5. FIG. 6A shows the peak activity at 6 AM to be nearly three times as loud as the quiet time three hours earlier. High noise levels may present an opportunity to conduct a high volume of operations. In contrast, operations during low background noise periods can significantly disrupt communities.

Using a predictive model implemented by embodiments of this disclosure, noise map data can be generated based on the predictions from the model. The noise map data can describe the predicted loudness (e.g., background noise loudness) of a plurality of locations within the geographic region. To create the noise map data the output of the model 320 can define the predicted background noise loudness (time varying loudness), as described herein, as well as an associated location (e.g., described by latitude coordinate, longitude coordinate, attitude, etc.). The model's outputted predictions can be aggregated to create the noise map data that indicates the predicted background noise loudness at the plurality of locations within a geographic area. For example, the noise map data can include noise heatmaps of a geographic region as predicted by the model. Examples of these predictions are shown in FIG. 6B and FIGS. 7A-B. FIG. 6B and FIGS. 7A-B show noise levels in a geographic region 650 and 700 at different times of day. Contrasting FIG. 6B with FIGS. 7A-B, the darker colors associated with FIGS. 7A-B relative to FIG. 6B indicate increased noise levels in the darker regions. FIG. 7B shows selection of a sky lane based on loudness data, according to at least some of the disclosed embodiments. A sky lane defines how air traffic may be routed through the geographic region shown in the image. FIG. 7B shows a first line 705 indicating how the sky lane is configured without loudness considerations. FIG. 7B also shows a second line 710 indicating the effect of considering loudness.

As further described herein, the noise map data can be utilized for various purposes associated with an aerial vehicle. For example, in some implementations, the noise map data can be utilized for aerial vehicle routing and/or sky lane optimization. For example, aerial vehicle routes can be generated based on the noise map data to create routes that would maintain an acceptable level of loudness for the locations along the route in the geographic area. The acceptable level of loudness may be a threshold (e.g., in decibels or other unit) under which a total noise level (e.g., predicted loudness plus aerial vehicle generated loudness/noise) is to remain below. The threshold may be set by a regulatory body or other authority, a service entity managing an aerial fleet, or the like. The routes and/or sky lanes can be created such that the aerial vehicles are routed in a manner not to exceed the acceptable level of loudness at any point along the route. Moreover, a sky lane for a route (e.g., a volume around a route in which the aerial vehicle is to stay within) can be generated to ensure that the aerial vehicle stays within a threshold distance along a route to maintain an acceptable noise level.

The noise map data can also, or alternatively, be used to determine one or more operating constraints of an aerial vehicle. For instance, time constraints identifying take-off times, flight travel times, landing times, times for a first take-off/landing of the day, times for a last take-off/landing of the day, etc. can be determined based on the noise map data. In particular, the noise map data can provide the predicted loudness at various times of the day and, thus, allow for flight time schedules to be generated to maintain an acceptable level of loudness. By way of example, the noise map data can help determine at which time in the morning and/or night flights should commence and/or end for the day, and/or what intermediate times may be better to have a lower aggregate nose level (e.g., when school is ending for the day).

Additionally, or alternatively, one or more landing constraints can be determined based on the noise map data. For example, the noise map data can help determine the take-off angle/direction and/or landing angle of approach that may best help to maintain a total noise level below the threshold acceptable level of loudness.

The noise map data can be utilized for assigning vehicles to routes within a geographic region and/or determining the flight frequency of the aerial vehicles along the routes. For example, the aerial vehicle fleet may include aerial vehicles of different types, makes, models, sizes, and so forth. As such, certain types of aerial vehicles within the aerial fleet may generate different levels of noise/loudness as the vehicle takes-off, lands, and/or traverses a route (e.g., due to differences in propulsion systems, payload capacity, fuel types, etc.). The aerial vehicle operating noise/loudness levels may be acquired and stored (e.g., via the aerial vehicle manufacturer/vendor), measured by sensors as the aerial vehicle operates, and/or calculated based on a vehicle model. As described herein, the noise map data can indicate the predicted loudness at locations along routes within a geographic region (e.g., a background noise layer), which can allow for the determination of how much additional noise/loudness can be added by an operating aerial vehicle (e.g., an aerial vehicle noise layer) to remain below an acceptable level of loudness. Based on such a determination, particular aerial vehicles can be selected and assigned to routes in order to maintain a total noise level below the acceptable level of loudness.

In some implementations, the frequency of the flights along a route/within a geographic region can be determined based on the noise map data. For instance, the number of times that aerial vehicles traverse a route can be determined to maintain an acceptable level of loudness in the locations along the route/within the mapped geographic region.

FIG. 8 shows an example machine learning module 800 according to some examples of the present disclosure. Machine learning module 800 utilizes a training module 810 and a prediction module 820. Training module 810 inputs historical information 830 into feature determination module 850A. The historical information 830 may be labeled. As described above, historical information may include historical measurements of dynamic feature information for a plurality of geographical regions. The dynamic feature information may be collected over a plurality of historical time periods (training time periods), which are also indicated in the historical information 830, at least in some embodiments. Static feature information for the geographical regions is also used in training of the model.

Feature determination module 850A determines features 860 from this historical information 830. Stated generally, features 860 are a set of the information input and is information determined to be predictive of a particular outcome. In some examples, the features 860 include all the historical activity data, but in other examples, the features 860 include a subset of the historical activity data.

Note that some features may initially be provided during different units of resolution. For example, in some embodiments, weather data is received in hex-level, road traffic is obtained as locations in two-dimensional space, air traffic information is obtained as locations in three-dimensional space, and some static features are provided on a grid. To aggregate these data, some embodiments perform noise attenuation for road traffic and air traffic (e.g. log method). Some embodiments apply linear weights to features represented on the grid. Some embodiments provide for a tunable radius to aggregate different features for a given point of interest.

Some embodiments tailor the historical activity data that is used to train the model so as to reduce multi co-linearity. During development of the disclosed embodiments, strong correlations between various features were identified. Thus, some embodiments use one or more of Principle Component Analysis (PCA) or recursive elimination to remove less relevant correlated features. These embodiments demonstrates significant performance improvements when compared to those embodiments that do not function to reduce multi co-linearity.

The machine learning algorithm 870 produces a model 806 (e.g. equivalent to trained model 314 in some aspects) based upon the features 860 and the label.

In the prediction module 820, current information 890 is input to the feature determination module 850B. Current information 890 may include dynamic feature information and static feature information for a particular geographic region. The particular geographic region may or may not have been included in the historical information 830.

Feature determination module 850B may determine the same set of features or a different set of features from the current information 890 as feature determination module 850A determined from historical information 830. In some examples, feature determination module 850A and 850B are the same module. Feature determination module 850B produces a feature vector 815, which is input into the model 806 to generate a loudness prediction 895 for the geographic region. The loudness prediction 895 includes predictions for multiple frequencies. In one example embodiment, the training module 810 may operate in an offline manner to train the model 806. The prediction module 820, however, may be designed to operate in an online manner. It should be noted that the model 806 may be periodically updated via additional training and/or user feedback.

The machine learning algorithm 870 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 810. In an example embodiment, a regression model is used and the model 806 is a vector of coefficients corresponding to a learned importance for each of the features in the features 860 and the feature vector 815. To calculate a score, a dot product of the feature vector 815 (features are not necessarily represented as vectors in some embodiments) and the vector of coefficients of the model 806 is taken.

The disclosed embodiments use a variety of features to train a model for noise prediction. In one example embodiment, these features include static features of a region and dynamic features for the region over multiple periods of time. In some embodiments, a time identifying a time period is provided in various formats, including, for example, hours from January 1 or a concatenation of month, day, and hour, or a concatenation of a weekend or weekday indicator with an indication of an hour of the day. In some embodiments, training input includes static location features (e.g. elevation), and time-dependent dynamic location features (e.g. traffic volume). In some embodiments, the inputs are location covariates (stationary and time-dependent) or location (e.g. latitude, longitude), time representation (e.g. hours from Jan. 1, 1970 or month+day+hour or in some embodiments a weekend/weekday indicator and/or an hour indication), or location covariates (stationary), time representation. Location covariates provide for predictions in new locations. In some embodiments, use of time-dependent covariates requires predicting covariate values when predicting future noise levels. In various embodiments, additional training inputs includes one or more of traffic volume, traffic speed, temperature, dewpoint, humidity, wind speed, wind direction, precipitation intensity, pressure, distance to a body of water (e.g. a stream or lake), elevation, distance from road(s), distance from railroad(s), distance from a coast, or distance from airport(s). The training set data generated by the measurement devices described above with respect to FIG. 1, in some embodiments, include features (both dynamic and static) and labels (SPL values or TVL spectra data or spectral data) for a location (e.g. latitude and longitude) and an hour of a day. Some embodiments provide noise measures in L90 form. L90 is a highest sound level exceeded during 90% of a measured time period. A sound measurement in L90 form is generally considered to represent background or ambient level of noise of a measured environment. One challenge with building a training set is to map different datasets to the same location. Some data sources use a random location, some of which fall on a road segment. Weather data uses hexagon identifiers and NPS data uses latitude and longitude for grid of points on a map a predetermined number of meters apart. Some of the disclosed embodiments include a process to unify these different location systems to minimize data loss and improve efficiency.

Some of the disclosed embodiments train the model using noise data gathered from flight track information obtained from the Federal Aviation Administration (FAA). The flight track information allows determination of distances between aircraft generating noise and noise measurements made by ground-based sensors. The flight track information is in the form (x, y, z, t) in at least some embodiments, with x, y, z defining a location of an aircraft in three dimension space (e.g. x, y are latitude, longitude, and z represents altitude either above ground level (AGL) or MSL (mean sea level) form. In some embodiments, one or more noise measurements are quantified based on a noise impact due to air traffic as:

Normalized noise impact due to air traffic at time t:

$$N_t = \sum \frac{1}{D^2 + z^2}$$

where:
$N_t$ is a normalized noise measurement at time t,
D is a Haversine distance between an aircraft location and a sensor taking the measurement, and
z is the altitude of the flight.

The disclosed embodiments can predict, via the trained model, for a given location and a given time, (e.g. a one-hour period) a sound pressure level (SPL) in dBA. This prediction generates one value, a scalar. The disclosed embodiments can further predict time varying loudness via the same trained model. This prediction can include multiple values (e.g. 150), which are represented as a vector in some embodiments. In various embodiments, either separate models for each prediction or a single model with multiple outputs could be utilized to obtain predictions of SPL and TVL. One TVL model generates via the disclosed subject matter results in an RMSE of 3.39, and R-squared of 0.69. This embodiment uses a decision-tree based model.

Values for different bands of TVL include some correlation. Thus, TVL spectrum output of the model is represented as a vector in some embodiments, with each unit in the vector representing a ⅓ octave band (e.g. 32). Alternatively, a model for each TVL band could be separately trained. Several model types can be used in example embodiments, including a linear model (e.g. linear regression, logistic regression), support vector regression, random forest regression, gaussian process, free-based models, multilayer perceptron (MLP)/neural network (NN), or ensembles of models.

FIG. 9 is a flowchart of a process 900 for processing training data before using the training data to train a model. In some aspects, the process 900 is performed by hardware processing circuitry. For example, in some embodiments, instructions stored in an electronic memory configure the hardware processing circuitry to perform one or more of the functions discussed below with respect to FIG. 9 and the process 900.

After start operation 902, the process 900 moves to operation 905. In operation 905, a radius is defined. The radius is implemented as a tunable parameter in some embodiments. The radius defines a distance from a sensor that will be searched for relevant features (from other sensors).

In operation 910, a location of a sensor is identified. In one example embodiment, process 900 iterates through a set of sensors, with operation 910 identifying a location of a sensor currently being analyzed by the process 900.

In operation 915, a region is determined based on the location and the radius. The location and radius define a circular region around the sensor location.

In operation 920, feature data points within the region are identified. In some aspects, the feature data points are aggregated to a single value for a particular location/time. In some aspects, equation (1) below is utilized for the aggregation, where n points are identified in a region $R_i$:

$$f_i = \sum_{j=1}^{n} \frac{1}{e^{-\alpha d_j}} f_i^j, \quad \forall\, i \in F$$

where:
F is a set of all feature names

In operation 925, a weighted average is generated from the data points. In some aspects, a principled weight function is applied. In some aspects, a negative exponential weight is utilized to approximate sound attenuation with distance. Thus, in some embodiments, for a feature i with distance d from the sensor location, the weight is $w_i=1/e^{\alpha d}$. The alpha value ($\alpha$) is based on environmental conditions within the region. Example environmental conditions comprise whether the environment is predominately urban, suburban, or rural, average height of buildings, and so forth. Some aspects use an alpha ($\alpha$) value of two (2).

In some other embodiments, one of the following weight equations is used $$wi = \frac{1}{d_j} \text{ or } wi = \frac{1}{d_j^2}.$$

In some embodiments, weights are normalized. In these embodiments, the weighted sum will be divided by the sum of the weights, or $$\sum_{j=1}^{n} \frac{1}{d_j} \text{ or } \sum_{j=1}^{n} \frac{1}{d_j^2}.$$

In operation 930, the weighted average is added to the training data. Decision operation 940 determines if additional sensor locations are to be evaluated. If so, process 900 returns to operation 910. Otherwise, process 900 moves to end operation 945.

FIG. 10 shows one observation of analysis of the training set described above. FIG. 10 shows a relatively strong correlation between sound pressure level (SPL) and traffic volume, given that SPL is high during rush hour and generally lower in the evening hours.

FIG. 11 shows a correlation matrix of model features in accordance with one embodiment. The correlation matrix 1100 shows correlations between traffic volume and speed (negative correlation) and dewpoint and temperature (positive). The correlation matrix 1000 also shows a correlation between speed and humidity.

To determine an appropriate model for loudness prediction, several analyses are done using a variety of different models. Initial tests trained a multiple linear regression model using seventy percent of the training data for training and thirty percent of the training data for testing. The results are shown in Table 3 below:

TABLE 3

| Metric | Value |
| --- | --- |
| Mean Squared Error (MSE) | 9.28 |
| Mean Absolute Error (MAE) | 2.28 |
| Root Mean Squared Error (RMSE) | 3.05 |
| R-Squared | 0.86 |

The metrics above show the linear regression model provided relatively good performance when predicting SPL. Further tests were performed to understand how well the model predicted noise for a time period not included in the training data. To perform this test, training data for a first time period is withheld from use in training the model, and then used to predict the accuracy of predictions made by the model for that first time period. The results are shown in table 4 below:

TABLE 4

| Metric | Value |
| --- | --- |
| Root Mean Squared Error (RMSE) | 3.28 |
| R-Squared | 0.82 |

The analysis above suggests the model can accurately predict SPL for a time period even if training data for that time period is absent.

FIGS. 12A-B show a flowchart of a process 1200 for predicting time varying background loudness on multiple frequencies. In some aspects, one or more of the functions discussed below with respect to process 1200 and FIGS. 12A-B are performed by hardware processing circuitry. For example, instructions stored in a hardware memory configure the hardware processing circuitry to perform one or more of the functions discussed below in at least some embodiments. In some aspects, one or more of the functions discussed below are performed by one or more of the trained model 320, and/or the routing system 323, both of which are discussed above with respect to FIG. 3.

After start operation 1205, process 1200 moves to operation 1210, which receives measurements of dynamic feature data for a geographic region.

In some embodiments, the dynamic feature data includes weather data in the region. Examples of weather data include one or more of temperature, dewpoint, barometric pressure, wind speed, wind direction, sun position, precipitation rate, percentage snow cover, snow thickness, or other weather data. The National Weather Service of the United States makes weather information available via a web service. Similar services are available in other jurisdictions. Some embodiments obtain weather data from a web service and thus receive the weather data in operation 1210.

The dynamic feature data includes, in some embodiments, noise information relating to man-made sources, or man-made feature data. Examples of man-made feature data include traffic speed and/or traffic amount on one or more roads, aircraft speed, rail speed, and/or traffic amount over the region. In some embodiments, the man-made feature data is received, at least indirectly, from one or more data sources. For example, current traffic data is available from a variety of web services maintained by local governments. Some embodiments of operation 1210 interface with these services to obtain information on traffic data. Similarly, the Federal Aviation Administration (FAA) maintains web services that provide aircraft flight information. Similar services are provided in jurisdictions outside the United States. Current rail traffic information is available via web services provided by rail operators. Operation 1210 accesses one or more of these services, in at least some embodiments, to obtain or receive dynamic man-made feature data.

In one example embodiment, dynamic feature data is measured and/or received in operation 1210 is for multiple different periods of time. For example, in some aspects, measurements are received periodically, such as every hour, half hour, or other time period.

In operation 1212, static features of the geographic region are determined. Examples of static features include one or more of elevation, distance from one or more roads, distance from one or more airports, a percentage vegetation in the region, composition of roads in the region (e.g. concrete, asphalt or cobble stone), distance to a railroad, distance to a coast (ocean or great lake), distance to a body of water (e.g. lake or stream). As discussed above with respect to FIG. 3, in some embodiments, operation 1212 reads static feature data from a static feature data store, such as the static feature data store 316, discussed above with respect to FIG. 3.

In operation 1215, the dynamic features and static features are provided to a model. For example, FIG. 3 shows a data flow that provides dynamic features (e.g. dynamic feature data 322) and static feature information 324 to the trained model 314. In some embodiments, providing dynamic and static features to the model include the trained model reading the dynamic and static features from data sources for this information, for example, as described above with respect to FIG. 3. As shown in FIG. 3, the trained model reads the static feature information for one or more geographic regions from a static feature data store 316 in some embodiments. Dynamic feature data for the region is also received by the trained model 320 (as dynamic feature data 322). As discussed above, the dynamic feature data is received, in some embodiments, from web services that provide the dynamic feature data, or directly from sensors which measure the dynamic feature information. As discussed above with respect to FIG. 3 and/or FIG. 8, the model is trained based on historical data collected from a plurality of sensors. The sensors detect time varying loudness across multiple frequencies in a plurality of geographic regions. Some of the sensors are configured to collected weather data, such as the temperature, dewpoint, humidity, wind speed, wind direction, and other weather data during multiple time periods. The detected time varying loudness and weather data is correlated according to a time at which the loudness and weather information is collected. Thus, the historical data describes, over a plurality of time periods, weather data, traffic data, and noise information for a particular region.

In one example embodiment, the historical data used to train the model also includes static features of the regions. For example, some embodiments obtain static information for a plurality of different regions, including amount of vegetation in a region, an amount (e.g. percent coverage) of hardscape (e.g. concrete, asphalt, buildings) in a region, or other static features as discussed above. In some embodiments, the static features used to train the model are obtained from a static feature data store, such as the static feature data store 316, discussed above with respect to FIG. 3.

Operation 1218 then predicts background noise loudness based on output from the trained model (e.g. trained model 320). The predicted background noise loudness is specific to defined time period, a geographic region or for any given location, based on weather information for the region, static features of the region, and dynamic features for the region, one or more of which are provided to the model as input in at least some embodiments, as described above. In some embodiments, the defined time period is a "current time period," based on when the prediction is performed. In other embodiments, the defined time period is passed to the model as input and the model is configured to generate the predicted background noise loudness during the defined time period based on the input.

The background noise loudness is predicted in operation 1218 for a particular time and a particular date within a defined time period. In some embodiments, the particular time, and/or particular date are passed to the model as input.

In operation 1220, noise map data is generated based on the model predicted background noise loudness within a geographic region (as outputted by the trained model). This can include, for example, aggregating the predicted loudness values at a plurality of locations to generate a heatmap (or other type of representation) describing the loudness at locations within the geographic region at one or more times, time ranges, and so forth. The predicted background noise loudness includes, in various embodiments, one or more of stationary, time-varying, partial, or partial specific noise loudness.

In some embodiments, generating noise map data in operation 1220 includes generating predicted background noise loudness for a plurality of geographic regions. The plurality of geographic regions adjoin each other (e.g. in a grid orientation), in some embodiments, so as to form a map of a portion of the earth's surface. The noise map data thus includes this plurality of geographic regions and their corresponding predicted background noise loudness.

In operation 1222, one or more aerial vehicle routes and/or sky lanes for the geographic area are determined based on the model predicted loudness and/or noise map data. This can include determining the locations/altitudes of the flight routes (and sky lanes associated therewith) so as to maintain an acceptable level of loudness in the geographic region, as described herein.

Some embodiments of operation 1222 determine an origin and destination of an aircraft flight. These embodiments then determine a plurality of possible routes between the origin and destination. Each of the plurality of possible routes includes a plurality of different geographic regions through which the aircraft travels to reach the destination from the origin location. Some of the embodiments of process 1200 generate predicted background noise in each of these geographic regions, based on dynamic and static feature data of each of the respective regions. This information is provided to the trained model and the model predicts the background noise for each of the geographic regions.

Some embodiments then select one of the plurality of routes based on the predicted background noise. For example, some embodiments aggregate predicted background noise along each of the routes (e.g. based on the predicted background noise of each region through which the aircraft passes when executing the route), and select the route with the most aggregated noise. Some embodiments set a regions predicted background noise to a predetermined maximum value before aggregating noise along a route, to limit bias in selection caused by particularly noisy regions.

As discussed above, some embodiments define flight routes to specify higher altitudes when traveling over a geographic region with a relatively low level of predicted background noise (e.g. noise below a predefined threshold). These embodiments define flight routes to specify lower altitudes when traveling over a geographic region with a relatively higher level of predicted background noise (e.g. above a predefined threshold). In some embodiments, the altitude for a region is also based on altitudes of neighboring regions along a route, so as to avoid too frequent altitude changes during the route.

In operation 1224, one or more aerial vehicle operating constraints are determined based on the predicted background loudness and/or noise map data. For instance, the predicted loudness and/or noise map data is utilized to determine aerial vehicle constraints, including operating constraints such as, for example: take-off times, in-flight travel times, landing times, times for a first take-off/landing of the day, times for a last take-off/landing of the day, take-off angle/direction, landing angle of approach, and/or other operating constraints. As one example of a vehicle constraint, a minimum climb rate of an aircraft after take-off is set, in some embodiments, based on a predicted background noise of one or more geographic regions the aircraft will overfly before reaching a cruising altitude. In some embodiments, a predicted background noise below a predefined noise threshold results in a minimum climb rate above a first rate threshold. In these embodiments, if the predicted background noise of a region overflown by the aircraft before it reaches its cruising altitude is above a second predefined noise threshold, the minimum climb rate is set below a second rate threshold. In some embodiments, the first rate threshold and the second rate threshold are equivalent.

As another example, a maximum range attribute of an aircraft required for a route between an origin and destination is constrained based on a distance from the origin to the destination along a selected route. As an example, some embodiments generate a plurality of different routes between the origin and the destination. In some cases, a route having a longer distance is selected, for example, so as to avoid a geographic region having a relatively low background noise. This longer route thus will require an aircraft having sufficient range to perform the route.

In operation 1226, aerial vehicles are assigned to aerial routes based on the predicted background loudness and/or the noise map data.

For example, as discussed above, constraints on aerial vehicles are determined based on the routes selected for travel between an origin and destination. In the example of climb rate above, an aerial vehicle is selected to perform a route based on a specification of the aerial vehicle indicating the aerial vehicle can climb at or above a minimum climb rate determined for the route (which is, in some embodiments, based on predicted background noise loudness of one or more geographic regions overflown by the aerial vehicle while performing the route). Similarly, a distance between an origin and destination when performing a selected route requires an aerial vehicle having a range that meets or exceeds the distance.

As an additional example, a first aerial route may include locations with higher levels of predicted loudness than a second aerial route. The aerial vehicle fleet can include a first aerial vehicle and a second aerial vehicle. The first aerial vehicle can be a different make, model, type, and so forth than the second aerial vehicle. The first aerial vehicle can produce a higher level of noise/loudness when operating (e.g., taking-off, landing, flying, etc.) than the second aerial vehicle. The first aerial vehicle (the louder vehicle) can be assigned to the first aerial route (the louder route) because the predicted background loudness at the locations along the first aerial route are more compatible with the operation of the first aerial vehicle. In this case, compatibility is determined by proportionality between the predicted background loudness of regions along the first aerial route and the loudness of the aerial vehicle. The second aerial vehicle (the quieter vehicle) can be assigned to the second aerial route (the quieter route) because the predicted loudness at the locations along the second aerial route and the noise generated by operation of the second aerial vehicle are compatible.

In another example, the first aerial vehicle may be assigned to the second aerial route because the locations along the second aerial route may have a higher acceptable level of loudness. The second aerial vehicle may be assigned to the first aerial route because the locations along the first aerial route may have a lower acceptable level of loudness.

In operation 1228, a frequency of aerial vehicle flights are determined based on the predicted background loudness and/or the noise map data. For instance, a number of times that aerial vehicles traverse a first route and/or second route are determined to maintain an acceptable level of background noise loudness in the locations along those routes, in at least some embodiments. For example, some embodiments limit a rate at which aircraft overfly a particular geographic region. This rate is adjusted, in some embodiments, based on a time of day and/or whether the day is a week day or a weekend day. The rate is also adjusted, in some embodiments, based on predicted background noise loudness.

After operation 1228, process 1200 moves to end operation 1230.

FIG. 13 is a block diagram showing one example of a software architecture 1300 for a computing device. The software architecture 1302 may be used in conjunction with various hardware architectures, for example, as described herein. FIG. 13 is merely a non-limiting example of a software architecture 1302 and many other architectures may be implemented to facilitate the functionality described herein. A representative hardware layer 1304 is illustrated and can represent, for example, any of the above-referenced computing devices. In some examples, the hardware layer 1304 may be implemented according to an architecture 1400 of FIG. 14 and/or the software architecture 1302 of FIG. 13.

The representative hardware layer 1304 comprises one or more processing units 1306 having associated executable instructions 1308. The executable instructions 1308 represent the executable instructions of the software architecture 1302, including implementation of the methods, modules, components, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the software architecture 1300.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke API calls 1324 through the software stack and receive a response, returned values, and so forth illustrated as messages 1326 in response to the API calls 1324. The layers illustrated are representative in nature and not all software architectures have all layers. For example, some mobile or special-purpose operating systems may not provide a frameworks/middleware 1318 layer, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. In some examples, the services 1330 include an interrupt service. The interrupt service may detect the receipt of a hardware or software interrupt and, in response, cause the software architecture 1302 to pause its current processing and execute an ISR when an interrupt is received. The ISR may generate an alert.

The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1316 may provide a common infrastructure that may be used by the applications 1320 and/or other components and/or layers. The libraries 1316 typically provide functionality that allows other software modules to perform tasks in an easier fashion than by interfacing directly with the underlying operating system 1314 functionality (e.g., kernel 1328, services 1330, and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 (also sometimes referred to as middleware) may provide a higher-level common infrastructure that may be used by the applications 1320 and/or other software components/modules. For example, the frameworks/middleware 1318 may provide various graphical user interface (GUI) functions, high-level resource management, high-level location services, and so forth. The frameworks/middleware 1318 may provide a broad spectrum of other APIs that may be used by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. The third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™ Windows® Phone, or other computing device operating systems. In this example, the third-party application 1342 may invoke the API calls 1324 provided by the mobile operating system such as the operating system 1314 to facilitate functionality described herein.

The applications 1320 may use built-in operating system functions (e.g., kernel 1328, services 1330, and/or drivers 1332), libraries (e.g., system libraries 1334, API libraries 1336, and other libraries 1338), or frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 13, this is illustrated by a virtual machine 1348. A virtual machine creates a software environment where applications/modules can execute as if they were executing on a hardware computing device. The virtual machine 1348 is hosted by a host operating system (e.g., the operating system 1314) and typically, although not always, has a virtual machine monitor 1346, which manages the operation of the virtual machine 1348 as well as the interface with the host operating system (e.g., the operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

FIG. 14 is a block diagram illustrating a computing device hardware architecture 1400, within which a set or sequence of instructions can be executed to cause a machine to perform examples of any one of the methodologies discussed herein. The hardware architecture 1400 describes a computing device for executing the vehicle autonomy system, described herein. In some embodiments, the hardware architecture 1400 is utilized by one or more of the untrained model 314, trained model 320 and/or the routing system 323, and/or the UTM 108, discussed above. In some embodiments, one or more of the untrained model 314, trained model 320, and routing system 323 are integrated into a single computing device, such as that represented by hardware architecture 1400. In some embodiments, each of the untrained model 314, trained model 320, and routing system 323 are implemented on physically separate and distinct computing devices, with each of these distinct computing devices including one or more of the components of hardware architecture 1400, discussed below. In some embodiments, one or more of the functions discussed above and attributed to one or more of the untrained model 314, trained model 320, and/or routing system 323 are performed by a shared group or "pool" of hardware devices, each of the hardware devices including one or more of the components discussed below with respect to FIG. 14.

The architecture 1400 may operate as a standalone device or may be connected (e.g., networked) to other machines. In a networked deployment, the architecture 1400 may operate in the capacity of either a server or a client machine in server-client network environments, or it may act as a peer machine in peer-to-peer (or distributed) network environments. The architecture 1400 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1400 includes a processor unit 1402 comprising at least one processor (e.g., a central processing unit (CPU), a graphics processing unit (GPU), or both, processor cores, compute nodes). The architecture 1400 may further comprise a main memory 1404 and a static memory 1406, which communicate with each other via a link 1408 (e.g., bus). The architecture 1400 can further include a video display unit 1410, an input device 1412 (e.g., a keyboard), and a UI navigation device 1414 (e.g., a mouse). In some examples, the video display unit 1410, input device 1412, and UI navigation device 1414 are incorporated into a touchscreen display. The architecture 1400 may additionally include a storage device 1416 (e.g., a drive unit), a signal generation device 1418 (e.g., a speaker), a network interface device 1420, and one or more sensors (not shown), such as a Global Positioning System (GPS) sensor, compass, accelerometer, or other sensor.

In some examples, the processor unit 1402 or another suitable hardware component may support a hardware interrupt. In response to a hardware interrupt, the processor unit 1402 may pause its processing and execute an ISR, for example, as described herein.

The storage device 1416 includes a machine-readable medium 1422 on which is stored one or more sets of data structures and instructions 1424 (e.g., software) embodying or used by any one or more of the methodologies or functions described herein. The instructions 1424 can also reside, completely or at least partially, within the main memory 1404, within the static memory 1406, and/or within the processor unit 1402 during execution thereof by the architecture 1400, with the main memory 1404, the static memory 1406, and the processor unit 1402 also constituting machine-readable media.

Executable Instructions and Machine-Storage Medium

The various memories (i.e., 1404, 1406, and/or memory of the processor unit(s) 1402) and/or storage device 1416 may store one or more sets of instructions and data structures (e.g., instructions) 1424 embodying or used by any one or more of the methodologies or functions described herein. These instructions, when executed by processor unit(s) 1402 cause various operations to implement the disclosed examples.

As used herein, the terms "machine-storage medium," "device-storage medium," "computer-storage medium" (referred to collectively as "machine-storage medium 1422") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1422 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1422 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1424 can further be transmitted or received over a communications network 1426 using a transmission medium via the network interface device 1420 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Example 1 is a system, comprising: hardware processing circuitry; one or more hardware memories storing instructions that when executed configure the hardware processing circuitry to perform operations comprising: receiving measurements of dynamic feature data for a geographic region; determining static features for the geographic region; generating a predicted background noise loudness in the geographic region during a defined time period using a model, the model trained on training data including historical measurements of the dynamic feature data for a plurality of regions over a plurality of training time periods and static features of the plurality of regions, wherein the geographic region is absent from the plurality of regions, wherein the defined time period occurs after the plurality of training time periods.

In Example 2, the subject matter of Example 1 optionally includes wherein the generating of the predicted background noise loudness predicts the background noise loudness at a particular time of day and a particular date within the defined time period, and the historical measurements of the dynamic feature data are correlated with a time of day and a date of the historical measurements.

In Example 3, the subject matter of any one or more of Examples 1-2 optionally include the operations further comprising determining a route for an aircraft based on the predicted background noise loudness in the geographic region.

In Example 4, the subject matter of Example 3 optionally includes the operations further comprising: predicting a first background noise loudness in a first region during a time period based on the model; predicting a second background noise loudness in a second region during the time period based on the model; determining the first background noise loudness is higher than the second background noise loudness, and routing the aircraft through the first region during the time period in response to the determination.

In Example 5, the subject matter of any one or more of Examples 1-4 optionally include the operations further comprising: generating, based on a model and for each of a plurality of regions in a map, a predicted background noise loudness of the respective region; identifying an origin and destination of an aircraft; identifying a plurality of routes from the origin to the destination, each of the plurality of routes including at least one of the plurality of regions in the map; comparing the predicted background noise loudness of the at least one of the plurality of regions included in a first route of the plurality of routes to the predicted background noise loudness of the at least one of the plurality of regions included in a second route of the plurality of routes; selecting the first route or the second route based on the comparison; and routing an aerial vehicle over the selected route.

In Example 6, the subject matter of Example 5 optionally includes the operations further comprising: aggregating predicted background noise loudness of regions included in the first route; aggregating predicted background noise loudness of regions included in the second route, wherein the selection of the first route or the second route is based on the first aggregating and the second aggregating.

In Example 7, the subject matter of any one or more of Examples 5-6 optionally include the operations further comprising: determining a minimum predicted background noise loudness along the selected route; comparing the minimum predicted background noise loudness to a noise threshold; and determining an altitude for the aircraft along the selected route to be above a predefined altitude in response to the minimum predicted background noise loudness being below the noise threshold.

Example 8 is a non-transitory computer readable storage medium comprising instructions that when executed configure hardware processing circuitry to perform operations comprising: receiving measurements of dynamic feature data for a geographic region; determining static features for the geographic region; generating a predicted background noise loudness in the geographic region during a defined time period using a model, the model trained on training data including historical measurements of the dynamic feature data for a plurality of regions over a plurality of training time periods and static features of the plurality of regions, wherein the geographic region is absent from the plurality of regions, wherein the defined time period occurs after the plurality of training time periods.

In Example 9, the subject matter of Example 8 optionally includes the operations further comprising determining a route for an aircraft based on the predicted background noise loudness in the geographic region.

In Example 10, the subject matter of Example 9 optionally includes the operations further comprising: predicting a first background noise loudness in a first region during a time period based on the model; predicting a second background noise loudness in a second region during the time period based on the model; determining the first background noise loudness is higher than the second background noise loudness, and routing the aircraft through the first region during the time period in response to the determination.

In Example 11, the subject matter of any one or more of Examples 8-10 optionally include the operations further comprising: generating, based on a model and for each of a plurality of regions in a map, a predicted background noise loudness of the respective region; identifying an origin and destination of an aircraft; identifying a plurality of routes from the origin to the destination, each of the plurality of routes including at least one of the plurality of regions in the map; comparing the predicted background noise loudness of the at least one of the plurality of regions included in a first route of the plurality of routes to the predicted background noise loudness of the at least one of the plurality of regions included in a second route of the plurality of routes; selecting the first route or the second route based on the comparison; and routing an aerial vehicle over the selected route.

In Example 12, the subject matter of Example 11 optionally includes the operations further comprising: aggregating predicted background noise loudness of regions included in the first route; aggregating predicted background noise loudness of regions included in the second route, wherein the selection of the first route or the second route is based on the first aggregating and the second aggregating.

In Example 13, the subject matter of any one or more of Examples 11-12 optionally include the operations further comprising: determining a minimum predicted background noise loudness along the selected route; comparing the minimum predicted background noise loudness to a noise threshold; and determining an altitude for the aircraft along the selected route to be above a predefined altitude in response to the minimum predicted background noise loudness being below the noise threshold.

Example 14 is a method performed by hardware processing circuitry, comprising: receiving measurements of dynamic feature data for a geographic region; determining static features for the geographic region; generating a predicted background noise loudness in the geographic region during a defined time period using a model, the model trained on training data including historical measurements of the dynamic feature data for a plurality of regions over a plurality of training time periods and static features of the plurality of regions, wherein the geographic region is absent from the plurality of regions, wherein the defined time period occurs after the plurality of training time periods.

In Example 15, the subject matter of Example 14 optionally includes wherein the generating of the predicted background noise loudness predicts the background noise loudness at a particular time of day and a particular date within the defined time period, and the historical measurements of the dynamic feature data are correlated with a time of day and a date of the historical measurements.

In Example 16, the subject matter of any one or more of Examples 14-15 optionally include determining a route for an aircraft based on the predicted background noise loudness in the geographic region.

In Example 17, the subject matter of Example 16 optionally includes predicting a first background noise loudness in a first region during a time period based on the model; predicting a second background noise loudness in a second region during the time period based on the model; determining the first background noise loudness is higher than the second background noise loudness, and routing the aircraft through the first region during the time period in response to the determination.

In Example 18, the subject matter of any one or more of Examples 14-17 optionally include generating, based on a model and for each of a plurality of regions in a map, a predicted background noise loudness of the respective region; identifying an origin and destination of an aircraft; identifying a plurality of routes from the origin to the destination, each of the plurality of routes including at least one of the plurality of regions in the map; comparing the predicted background noise loudness of the at least one of the plurality of regions included in a first route of the plurality of routes to the predicted background noise loudness of the at least one of the plurality of regions included in a second route of the plurality of routes; selecting the first route or the second route based on the comparison; and routing an aerial vehicle over the selected route.

In Example 19, the subject matter of Example 18 optionally includes aggregating predicted background noise loudness of regions included in the first route; aggregating predicted background noise loudness of regions included in the second route, wherein the selection of the first route or the second route is based on the first aggregating and the second aggregating.

In Example 20, the subject matter of any one or more of Examples 18-19 optionally include determining a minimum predicted background noise loudness along the selected route; comparing the minimum predicted background noise loudness to a noise threshold; and determining an altitude for the aircraft along the selected route to be above a predefined altitude in response to the minimum predicted background noise loudness being below the noise threshold.

We claim:

1. A system, comprising:
   hardware processing circuitry;
   one or more hardware memories storing instructions that when executed configure the hardware processing circuitry to perform operations comprising:
   receiving measurements of dynamic feature data for a geographic region;
   determining static features for the geographic region;
   generating a predicted background noise loudness in the geographic region during a defined time period using a model, the model trained on training data including historical measurements of dynamic feature data for a plurality of regions over a plurality of training time periods and static features of the plurality of regions, wherein the geographic region is absent from the plurality of regions, wherein the defined time period occurs after the plurality, of training time periods;
   determining, based on the predicted background noise loudness, whether to route an aircraft through the geographic region;
   determining a route and one or more operating constraints based on the predicted background noise loudness in the geographic region, the one or more operating constraints indicative of at least one of: a take-off maneuver or a landing maneuver associated with the route;
   selecting an aircraft, from among a plurality of different aircrafts, for the route based on the predicted background noise loudness, the one or more operating constraints, and capabilities of the aircraft; and
   routing the aircraft through a particular geographic region based on the determined route.

2. The system of claim 1, wherein the generating of the predicted background noise loudness predicts the background noise loudness at a particular time of day and a particular date within the defined time period, and the historical measurements of the dynamic feature data are correlated with a time of day and a date of the historical measurements.

3. The system of claim 1, the operations further comprising:
   wherein generating the predicted background noise loudness comprises:
     predicting a first background noise loudness in a first region during the defined time period based on the model;
     predicting a second background noise loudness in a second region during the defined time period based on the model;

determining the first background noise loudness is higher than the second background noise loudness; and wherein routing the aircraft comprises routing the aircraft through the first region during the defined time period in response to the determination.

4. The system of claim 1, the operations further comprising:

wherein generating the predicted background noise loudness comprises generating, based on the model and for each of the plurality of regions in a map, a predicted background noise loudness of the respective region;

wherein determining the route comprises:
identifying an origin and destination;
identifying a plurality of routes from the origin to the destination, each of the plurality of routes including at least one of the plurality of regions in the map;
determining a comparison of the predicted background noise loudness of the at least one of the plurality of regions included in a first route of the plurality of routes to the predicted background noise loudness of the at least one of the plurality of regions included in a second route of the plurality of routes; and
selecting the first route or the second route based on the comparison; and wherein routing the aircraft comprises routing the aircraft over the selected route.

5. The system of claim 4, the operations further comprising:

aggregating predicted background noise loudness of regions included in the first route; and
aggregating predicted background noise loudness of regions included in the second route, wherein the selection of the first route or the second route is based on the first route aggregating and the second route aggregating.

6. The system of claim 4, the operations further comprising:

determining a minimum predicted background noise loudness along the selected route;
comparing the minimum predicted background noise loudness to a noise threshold; and
determining an altitude for the aircraft, along the selected route to be above a predefined altitude in response to the minimum predicted background noise loudness being below the noise threshold.

7. The system of claim 1, wherein the capabilities of the aircraft are indicative of the ability of the aircraft to perform one or more maneuvers for the route and complete the route without violating a noise threshold given the predicted background noise loudness.

8. The system of claim 1, wherein the take-off maneuver comprises a take-off angle and the landing maneuver comprises a landing angle.

9. A non-transitory computer readable storage medium comprising instructions that when executed configure hardware processing circuitry to perform operations comprising:

receiving measurements of dynamic feature data for a geographic region;
determining static features for the geographic region; and
generating a predicted background noise loudness in the geographic region during a defined time period using a model, the model trained on training data including historical measurements of dynamic feature data for a plurality of regions over a plurality of training time periods and static features of the plurality of regions, wherein the geographic region is absent from the plurality of regions, wherein the defined time period occurs after the plurality of training time periods;
determining, based on the predicted background noise loudness, whether to route an aircraft through the geographic region;
determining a route and one or more operating constraints based on the predicted background noise loudness in the geographic region, the one or more operating constraints indicative of at least one of: a take-off maneuver or a landing maneuver associated with the route;
selecting an aircraft, from among a plurality of different aircrafts, for the route based on the predicted background noise loudness, the one or more operating constraints, and capabilities of the aircraft; and
routing the aircraft through the geographic region based on the determined route.

10. The non-transitory computer readable storage medium of claim 9, the operations further comprising:

wherein generating the predicted background noise loudness comprises:
predicting a first background noise loudness in a first region during the defined time period based on the model;
predicting a second background noise loudness in a second region during the defined time period based on the model;
determining the first background noise loudness is higher than the second background noise loudness; and wherein routing the aircraft comprises routing the aircraft through the first region during the defined time period in response to the determination.

11. The non-transitory computer readable storage medium of claim 9, the operations further comprising:

wherein generating the predicted background noise loudness comprises generating, based on the model and for each of the plurality of regions in a map, a predicted background noise loudness of the respective region;

wherein determining the route comprises:
identifying an origin and destination of an aircraft;
identifying a plurality of routes from the origin to the destination, each of the plurality of routes including at least one of the plurality of regions in the map;
determining a comparison of the predicted background noise loudness of the at least one of the plurality of regions included in a first route of the plurality of routes to the predicted background noise loudness of the at least one of the plurality of regions included in a second route of the plurality of routes; and
selecting the first route or the second route based on the comparison; and wherein routing the aircraft comprises routing the aircraft over the selected route.

12. The non-transitory computer readable storage medium of claim 11, the operations further comprising:

aggregating predicted background noise loudness of regions included in the first route; and
aggregating predicted background noise loudness of regions included in the second route, wherein the selection of the first route or the second route is based on the first route aggregating and the second route aggregating.

13. The non-transitory computer readable storage medium of claim 11, the operations further comprising:

determining a minimum predicted background noise loudness along the selected route;

comparing the minimum predicted background noise loudness to a noise threshold; and determining an altitude for the aircraft along the selected route to be above a predefined altitude in response to the minimum predicted background noise loudness being below the noise threshold.

14. A method performed by hardware processing circuitry, comprising:

receiving measurements of dynamic feature data for a geographic region;

determining static features for the geographic region; and generating a predicted background noise loudness in the geographic region during a defined time period using a model, the model trained on training data including historical measurements of dynamic feature data for a plurality of regions over a plurality of training time periods and static features of the plurality of regions, wherein the geographic region is absent from the plurality of regions, wherein the defined time period occurs after the plurality of training time periods;

determining, based on the predicted background noise loudness, whether to route an aircraft through the geographic region;

determining a route and one or more operating constraints based on the predicted background noise loudness in the geographic region, the one or more operating constraints indicative of at least one of: a take-off maneuver or a landing maneuver associated with the route;

selecting an aircraft, from among a plurality of different aircrafts, for the route based on the predicted background noise loudness, the one or more operating constraints, and capabilities of the aircraft; and routing the aircraft through the geographic region based on the determined route.

15. The method of claim 14, wherein the generating of the predicted background noise loudness predicts the background noise loudness at a particular time of day and a particular date within the defined time period, and the historical measurements of the dynamic feature data are correlated with a time of day and a date of the historical measurements.

16. The method of claim 14, further comprising:

wherein generating the predicted background noise loudness comprises:

predicting a first background noise loudness in a first region during the defined time period based on the model;

predicting a second background noise loudness in a second region during the defined time period based on the model;

determining the first background noise loudness is higher than the second background noise loudness; and wherein routing the aircraft comprises routing the aircraft through the first region during the defined time period in response to the determination.

17. The method of claim 14, further comprising:

wherein generating the predicted background noise loudness comprises generating, based on the model and for each of the plurality of regions in a map, a predicted background noise loudness of the respective region;

wherein determining the route comprises:

identifying an origin and destination of an aircraft;

identifying a plurality of routes from the origin to the destination, each of the plurality of routes including at least one of the plurality of regions in the map;

determining a comparison of the predicted background noise loudness of the at least one of the plurality of regions included in a first route of the plurality of routes to the predicted background noise loudness of the at least one of the plurality of regions included in a second route of the plurality of routes;

selecting the first route or the second route based on the comparison; and wherein routing the aircraft comprises routing the aircraft over the selected route.

18. The method of claim 17, further comprising:

aggregating predicted background noise loudness of regions included in the first route; and aggregating predicted background noise loudness of regions included in the second route, wherein the selection of the first route or the second route is based on the first route aggregating and the second route aggregating.

19. The method of claim 17, further comprising:

determining a minimum predicted background noise loudness along the selected route;

comparing the minimum predicted background noise loudness to a noise threshold; and determining an altitude for the aircraft along the selected route to be above a predefined altitude in response to the minimum predicted background noise loudness being below the noise threshold.

20. The method of claim 14, wherein the dynamic features are indicative of at least one of: weather, sound levels, or traffic associated with the geographic area; and wherein the static features are indicative of at least one of: elevation, vegetation, topography, or a distance to a road associated with the geographic area.

* * * * *